United States Patent
Papi et al.

(10) Patent No.: US 12,416,730 B1
(45) Date of Patent: Sep. 16, 2025

(54) OBJECT DETECTION AND TRACKING USING MACHINE LEARNING TRANSFORMER MODELS WITH ATTENTION

(71) Applicant: Zoox, Inc., Foster City, CA (US)

(72) Inventors: Francesco Papi, Oakland, CA (US); John Bryan Carter, Upton, MA (US); Yunming Shao, Fremont, CA (US); Qian Song, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 261 days.

(21) Appl. No.: 18/104,082

(22) Filed: Jan. 31, 2023

(51) Int. Cl.
| | |
|---|---|
| *G01S 17/931* | (2020.01) |
| *B60W 40/02* | (2006.01) |
| *B60W 60/00* | (2020.01) |
| *G01S 17/86* | (2020.01) |
| *G05B 13/02* | (2006.01) |

(52) U.S. Cl.
CPC ........... *G01S 17/931* (2020.01); *B60W 40/02* (2013.01); *B60W 60/001* (2020.02); *G01S 17/86* (2020.01); *G05B 13/027* (2013.01); *B60W 2420/408* (2024.01); *B60W 2554/00* (2020.02)

(58) Field of Classification Search
CPC ...... G01S 17/931; G01S 17/86; B60W 40/02; B60W 60/001; B60W 2420/408; B60W 2554/00; G05B 13/027
See application file for complete search history.

(56) References Cited

U.S. PATENT DOCUMENTS

| | | | |
|---|---|---|---|
| 11,780,472 B2 * | 10/2023 | Li | G06N 3/045 701/23 |
| 11,921,824 B1 * | 3/2024 | Hester | G06N 3/045 |
| 11,971,955 B1 * | 4/2024 | Chakraborty | G06F 3/04845 |
| 2013/0184887 A1 * | 7/2013 | Ainsley | G05B 13/026 700/291 |
| 2019/0019017 A1 * | 1/2019 | Wang | G07C 9/00896 |
| 2019/0353774 A1 * | 11/2019 | Chondro | G01S 17/86 |
| 2021/0133491 A1 * | 5/2021 | Wang | G06V 40/23 |
| 2021/0146963 A1 * | 5/2021 | Li | G06N 20/00 |
| 2021/0216780 A1 * | 7/2021 | Barzelay | G06F 18/217 |
| 2021/0295113 A1 * | 9/2021 | Sless | G06F 18/25 |
| 2021/0397907 A1 * | 12/2021 | Derbisz | G06F 18/251 |
| 2021/0405185 A1 * | 12/2021 | Price | G01S 13/931 |
| 2022/0156533 A1 * | 5/2022 | Hu | G06V 30/2504 |

(Continued)

*Primary Examiner* — Kenny Nguyen
(74) *Attorney, Agent, or Firm* — Lee & Hayes, P.C.

(57) ABSTRACT

Object detection and tracking systems may use machine-learned transformer models with self-attention for detecting, classifying, and/or tracking objects in an environment. Techniques described herein may include receiving sensor data generated by different sensor modalities of a vehicle, determining different bounding shapes based on the different sensor modalities, and using a machine-learned transformer model to determine associated and/or combined bounding shapes. The machine-learned transformer model may receive a variable number of input bounding shapes representing any number of objects and various sensor modalities. Multiple stages of the transformer may be used to determine associated bounding shapes and to assign attributes for the associated bounding shapes, based on the individual bounding shapes of the different sensor modalities and/or previous bounding shapes for objects detected and tracked in a previous scene in the environment.

20 Claims, 9 Drawing Sheets

(56) References Cited

U.S. PATENT DOCUMENTS

| | | | |
|---|---|---|---|
| 2022/0182784 A1* | 6/2022 | Bhagat | G01S 17/86 |
| 2022/0319328 A1* | 10/2022 | Zhang | G06V 20/56 |
| 2023/0092248 A1* | 3/2023 | Xiong | G06T 7/50 |
| | | | 382/103 |
| 2023/0206456 A1* | 6/2023 | Lee | G06V 10/764 |
| | | | 382/266 |
| 2023/0251384 A1* | 8/2023 | Gangundi | G01S 7/497 |
| | | | 356/4.01 |
| 2023/0257003 A1* | 8/2023 | Malekmohammadi | |
| | | | G06V 10/82 |
| | | | 382/104 |

* cited by examiner

OBJECT DETECTION AND TRACKING USING MACHINE LEARNING TRANSFORMER MODELS WITH ATTENTION

BACKGROUND

Autonomous vehicles may include various software-based systems, hardware-based systems, and/or controllers to guide the vehicle through an environment. For example, a controller of an autonomous vehicle can use sensor data captured by sensor systems to perceive objects, predict trajectories, and plan and optimization routes to guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze the sensor data in various ways to make driving decisions. However, since autonomous vehicles may include two or more different types (or modalities) of sensors and the sensor data may accordingly widely vary in its format, sensor placement, sensor characteristics, and content, the detections generated by two different sensor types may differ. Small discrepancies between the detections determined in association with two different sensor types may cause object representations created by the vehicle to jitter and/or flicker. Sensors of different types may also be prone to different error variations in size, distances, and depth measurements, which may further complicate object detection and tracking. This may impede the efficiency of navigating a vehicle safely and/or training machine-learning (ML) models. Moreover, techniques for reducing the discrepancies and/or smoothing the object representations or data related thereto may consume computing bandwidth and/or memory.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
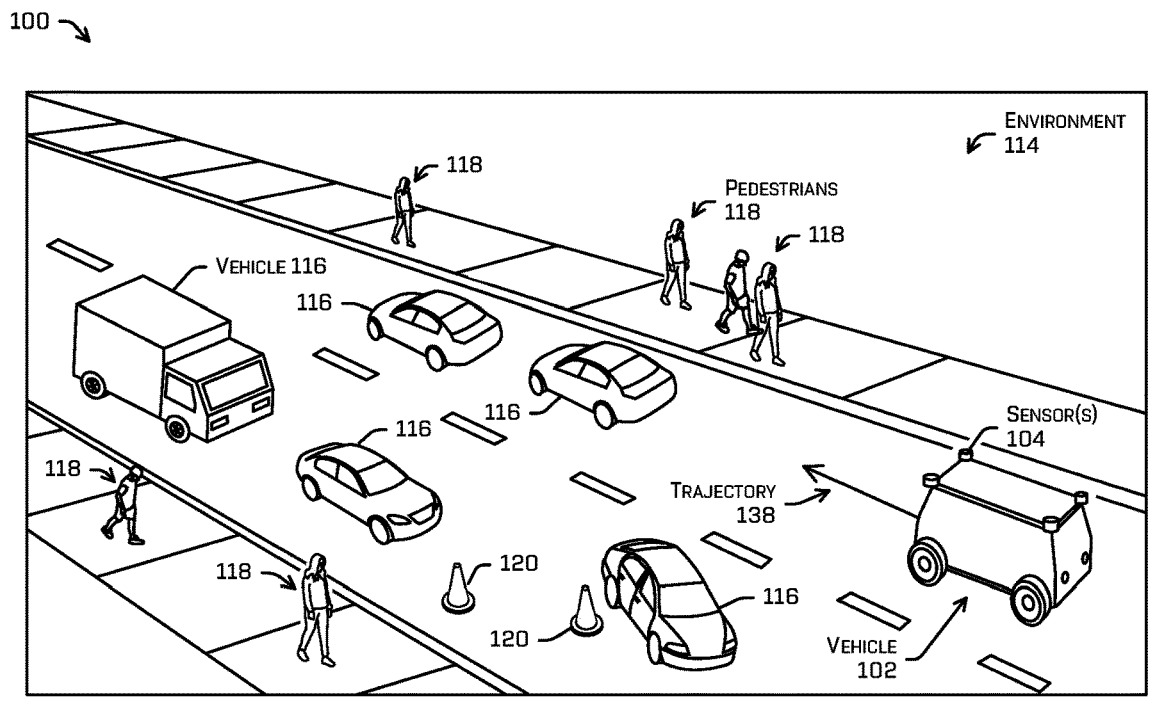
FIG. 1 illustrates an example technique of using a machine-learned transformer model to determine associations between object detections from various sensor modalities, in accordance with one or more examples of the disclosure.
Figure 1:
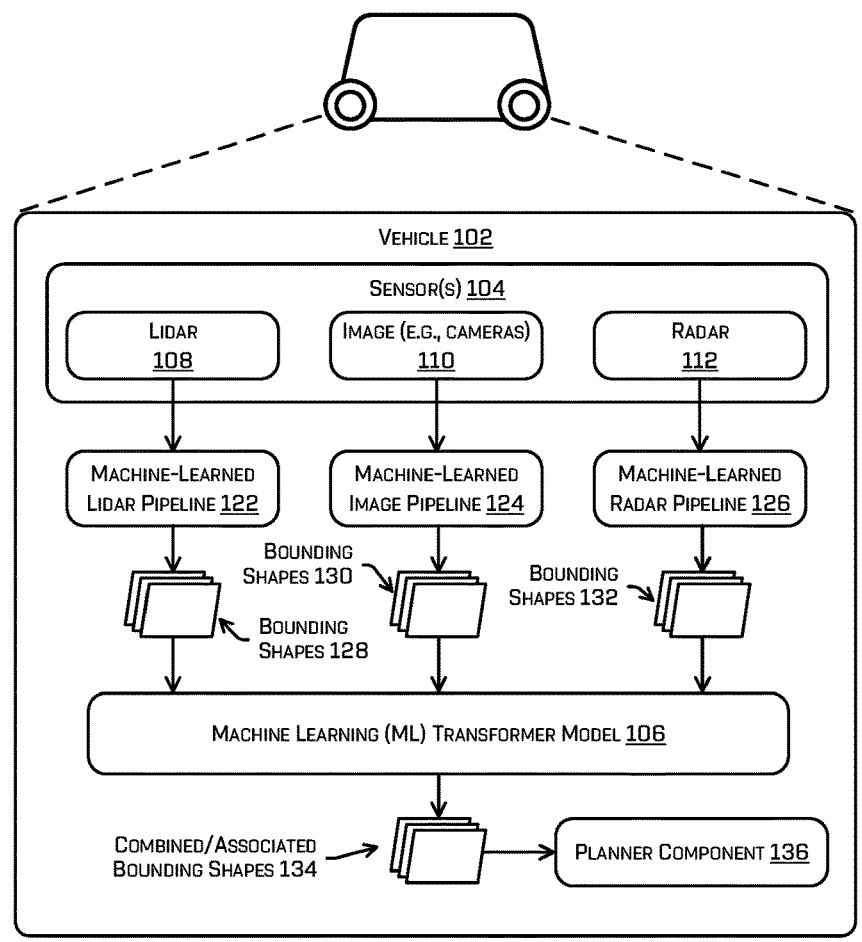

Techniques described herein relate to detecting, classifying, and tracking objects in an environment based on multiple sensor data inputs received from different sensor modalities. In various examples, a perception component may receive different sets of object detections, which may include bounding shapes (e.g., bounding boxes or bounding contours) and/or other data representing objects detected or perceived from sensor data captured by different sensor modalities within the environment. The perception component may use a machine-learned transformer model with self-attention to determine associated and/or combined object detections (e.g., bounding shapes) representing the objects in the environment, based on the object detections (e.g., bounding shapes) from the various sensor modalities. For example, the transformer model may receive an input set of object detections for a current scene in an environment, which may include a variable (e.g., non-fixed) number of input object detections, based on the various objects detected in the environment by any number of sensor modalities. The input set of object detections may include multiple object detections that represent the same physical object, for instance, different object detections generated based on lidar data, vision data (e.g., images or video), radar data, and/or various other sensor data modalities. The transformer model may receive the input set of object detections, and may be configured and trained to determine the subsets of object detections that are associated with the same physical object in the environment. The transformer model also may determine and/or refine the perceived attributes of the physical object (e.g., classification, yaw, intent, etc.), and may assign the determined attributes to the associated/combined object detections (e.g., bounding shape) representing the object. In some examples, the transformer model also may use previous object detections and/or previous object tracks determined by the perception component, based on previous scenes in the environment, and may associate the object detections in the current scene with the previously detected objects and/or tracks from the previous scenes.

As noted above, by utilizing different types of sensor modalities to detect objects and determine additional information associated with an environment, a perception component may determine a more accurate representation of the environment. However, processing different types (or modalities) of sensor data in combination, and in a way that is useful, can be difficult. For example, sensor data captured from the same environment using different sensor modalities can include discrepancies in the number of detected objects, and/or in the location, size, or other attributes of the detected objects, as sensors of different modalities may capture different data and may be prone to different error variations, etc. Processing different modalities of sensor data in combination, such that sensor data from one modality can be used to improve detections made in sensor data from another modality, and vice-versa, can be error-prone and computationally expensive.

For example, using captured sensor data from various sensors in combination with each other to improve autonomous vehicle perception is challenging. For instance, pipelines for processing sensor data and generating object detections (e.g., bounding boxes or other bounding shapes) based on the sensor data can be developed independently for particular sensor modalities. That is, a first pipeline for generating bounding boxes based on image frames may be developed for processing camera data, a second pipeline for generating bounding boxes based on lidar point clouds may be developed for processing lidar data, etc. In such pipelines, various techniques have been developed to fuse or otherwise combine sensor data together from multiple sensors of the same modality (e.g., multiple cameras, multiple lidars, etc.). However, existing solutions may be unable to effectively combine sensor data from different sensor types/modalities, to make improved inferences and/or accurately determine combined bounding boxes based on the aggregated sensor data. Additionally, it can be technically difficult to combine different modalities of sensor data, as the various sensor modalities may be prone to different errors and variations in sensor data. Thus, there is no solution to process sensor data from different sensor modalities in a way that effectively and accurately generates unified and/or combined object detections/bounding shapes using sensor data from one modality to improve the bounding shape features and attributes determined by another modality, and vice versa.

Certain existing systems may determine associations between bounding boxes generated from different sensor modalities, including both rules-based systems for determining bounding box associations and machine learning (ML) systems based on visual representations of the environment. For example, certain systems may use convolutional neural networks (CNNs) trained to receive and analyze image data representing a top-down view of an environment. In such systems, bounding boxes representing the objects detected in the environment may be rendered within the top-down view, and the CNN may be trained to analyze multiple views from different sensor modalities to attempt to determine an "optimal" top-down view that includes the bounding shapes that most accurately represent the physical objects in the environment. However, existing systems for determining bounding shape associations can include a number of technical disadvantages, including inaccurate results and computational inefficiencies. For instance, CNN-based systems for determining bounding box associations may require additional pre-processing steps (e.g., image transformation, encoding, and rasterization) to render the bounding boxes received from the various sensor modalities into a 2D top-down image for the CNN, as well as corresponding post-processing steps to determine the set of distinct bounding boxes based the 2D image data output from the CNN. Additionally, CNN-based systems may operate based on a fixed-size pixel grid, which causes limitations in the object detection range and/or the accuracy and resolution of the grid. As a result, CNN-based systems may have range limitations and/or may be inaccurate in scenes where multiple objects (e.g., vehicles, pedestrians, etc.) are close enough that they may occupy overlapping or adjacent pixels within the 2D image. Thus, image-based machine learning systems (e.g., CNNs) and other existing systems may be ineffective in determining bounding box associations in some cases, and also may be computationally expensive and inefficient.

To address the technical problems and inefficiencies of existing systems for determining associated and/or combined bounding shapes based on separate sensor data from different sensor modalities, the techniques described herein may include using a machine-learned transformer model to determine associated subsets of object detections with improved bounding shapes and/or object attributes based on the various sensor modalities. As described below in more detail, any number of various transformer architectures may be used with these techniques, allowing the transformer model to receive input bounding shapes from the various sensor modalities, and to output a corresponding set (or stream) of object detections with a one-to-one constraint to solve over segmentation. For instance, any number of transformer models may be used including a transformer-based encoder/decoder architecture. When the transformer model is implemented within a vehicle, and operated based on the sensor data captured by the sensor modalities of the vehicle, the transformer model may provide a track and/or detection embedding to one or more downstream components to control the operation of the vehicle in the environment.

As described in the various examples herein, these techniques for determining object detection (e.g., bounding shape, etc.) associations based on multiple sensor modalities may provide a number of technical advantages over rules-based systems and/or image-based machine learning systems. For example, various techniques herein may include machine-learned transformer models that support variable (e.g., changeable and non-fixed) numbers of inputs. For each scene in an environment, any number of different sensor modalities may be used, and each sensor modality may separately generate any number of bounding shapes based on the objects detected in the environment. As a result, the input to the ML transformer model may include variable sets of input object detections, without having a defined order and/or labels, where the number of inputs and/or outputs can change from moment-to-moment or frame-to-frame while the perception component is detecting and tracking the objects in the environment.

Using an ML transformer model in this context allows the perception component to more accurately determine associations between subsets of bounding shapes from different sensor modalities, as well as determine the optimal attributes for the bounding shapes that most accurately represent the attributes of the physical object detected by the sensors (e.g., location, size, yaw, and classification). For a particular scene in a driving environment (or any other environment in which sensors are used to detect objects), the aggregated number of object detections from the sensors modalities is unknown and may change unpredictably at different times in the scene. The number of bounding shapes/object detections also may change unpredictably from one time point to the next time point in the scene, representing object detections that are moving apart, coming together, and/or changing in size, location, velocity, yaw, etc. As illustrated in the examples herein, a transformer-based ML model with encoder/decoder architecture provides greater flexibility, efficiency, and accuracy when determining object detections associations and attributes. For the various transformer-based architectures described herein, the transformer model can receive any number of bounding shapes as input, from any number of different sensor modalities, and in any order. Unlike image-based ML systems, the object detection (e.g., bounding shape) inputs to the transformer model can include bounding shapes of any size and any range/distance, and can distinguish bounding shapes that are adjacent to or overlapping with other bounding shapes. At each time in the environment, due to differences in the sensor data, the execution of the transformer model can include more or fewer inputs than the previous execution. Additionally, the execution of the transformer model also may be based on feedback from the previous outputs of the transformer model and/or object tracking data, so that objects in the current scene can be associated with the objects previously detected and tracked by the perception component.

Additionally, the machine-learned transformer models described herein may be configured to receive sets of input object detections from the various sensor modalities, and to output a different set of object detections representing the associated (e.g., combined) set of object detections for the various objects perceived in the environment. Therefore, unlike image-based ML models, the ML transformer models herein do not require the same pre-processing and/or post-processing steps described above for CNN-based systems, such as image encoding, rasterization, 2D rendering, etc.

In some examples, the ML transformer model also may include self-attention components configured to determine embeddings and/or attention vectors associated with the various object detections provided as input to the transformer model. By using a global attention mechanism, such as the self-attention components described herein, the ML transformer model allows the different object detections to interact with (e.g., attend to) each of the additional object detections at the information level. As a result, the ML transformer model may successfully determine associations between subsets of object detections that are not necessarily local (e.g., within a threshold distance) to one another, which may allow the transformer model to more accurately determine object detection/bounding shape associations in the event of invalid or anomalous object detections caused by reflected sensor data or other errors within one or more of the sensor modalities.

Further, the techniques described herein for using a transformer-based architecture including self-attention, may provide additional efficiencies and permit additional ML-based features that cannot be implemented in other architectures. Examples of such features include the ability to perform end-to-end training of the object detection/bounding shape association model, self-attention distillation which allows the model to learn from itself without additional supervision, and the ability to incorporate different types of layers (e.g., normalization) into the encoder/decoder architecture which are ineffective in CNNs.

For at least these reasons, the techniques described herein also can improve the safe operation of autonomous vehicles. For instance, the disclosed techniques, among other things, improve an autonomous vehicle's ability to detect, classify, and track certain objects in an environment. Being able to detect, classify, and track objects may be critical for the overall safety and quality of autonomous driving. The technologies disclosed herein can classify objects based on a combination of sensor modalities, such as vision (e.g., images), lidar, and/or radar data. For instance, using the technologies described herein, an object can be tracked with high certainty as to the object's location, size, velocity, yaw, and classification, etc. This is due to the ability to process and analyze object detections and/or bounding shapes from different sensor modalities in an ML transformer model, and determine associated (e.g., combined) object detections with improved accuracy over the object detections generated by the individual sensor modalities.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vision systems, such as security systems, object inspection and/or quality assurance systems, environment monitoring systems, etc.

As used herein, an object detection (which may also be referred to as a sensor observation) may include data representing an object that has been observed (e.g., detected or perceived) in an environment, based on sensor data from one or more sensors. An object detection may include geometric data indicating a location, size, and/or shape of the object in an environment. For instance, in some cases, an object detection may include a bounding shape such as a 2D bounding box, a 3D bounding box, and/or a bounding contour. Additionally or alternatively, an object detection may include other geometric data identifying the location of one or more points on an object (e.g., points in an x-y or x-y-z coordinate system), and one or more size dimensions for the object. In addition to bounding shape or other geometric data for an object, an object detection also may include a classification and/or other attributes of the detected object. A classification of an object may include classifications such as vehicle, pedestrian, bicycle, animal, traffic sign, road debris, etc. For certain classifications (e.g., vehicles), the classification data may include sub-classification data (e.g., cars, trucks, busses, emergency vehicles, etc.). Examples of additional attributes that may be included in an object detection can include, but are not limited to, yaw, velocity, acceleration, intent, etc.

Various examples herein relate to receiving sensor data (and/or object detections or bounding shapes determined based on the sensor data) from with different sensor modalities. As used herein, a sensor modality may refer to a type of sensor data and/or to a type of sensor configured to capture or process sensor data. Examples of sensor modalities may include, but are not limited to, lidar, radar, vision (e.g., image and/or video), sonar, depth, time-of-flight, audio, cameras (e.g., RGB, IR, intensity, depth, etc.), and the like.

Certain examples herein describe receiving sensor data and/or object detections from two or more different sensor modalities. However, in other examples, some or all of the techniques described herein may be applied to sensor data and/or object detections associated with a single sensor modality. For instance, an individual sensor of a single modality (e.g., a lidar sensor) may be prone to over-segmentation, and thus may output multiple object detections/bounding shapes representing the same physical object in the environment. Similarly, another individual sensor of a single modality (e.g., a vision-based sensor) may be prone to under-segmentation, and thus may output one object detection/bounding shape representing multiple nearby objects in the environment. In various examples, a ML transformer model may be used to determine associated object detections (e.g., bounding shapes representing the same detected object) and attributes for the associated bounding shapes (e.g., location, size, yaw, velocity, classification, etc.), based on any input set of object detections where a subset of input object detections may be associated with the same physical object. As an example, the input set of object detections to the transformer model may include object detections from a single sensor modality (e.g., lidar), based on sensor data captured by multiple sensors of the modality (e.g., different lidar sensors on the same vehicle). As another example, the input object detections to the transformer model may include different sets of object detections generated using different object detection/bounding shape generation techniques (e.g., different ML pipelines) based on the same underlying set of raw sensor data (e.g., an image frame or point cloud) from a single sensor modality. Additionally or alternatively, the input set of object detections may include different object detections from the same sensor modality, associated with different times (e.g., consecutive image frames or point clouds, etc.).

FIG. 1 shows a diagram 100 illustrating a technique of using a machine learning transformer model for analyzing sensor data from various sensor modalities for vehicle perception. In particular, this diagram illustrates an example system in which an ML transformer model 106 is used to determine associated and/or combined object detections based on sets of input object detections generated from various sensor modalities. As shown in this example, the vehicle 102 may include one or more sensor(s) 104, such lidar sensor(s) 108, image sensor(s) 110 (e.g., cameras), radar sensor(s) 112, and/or the like. In at least one example, the sensor(s) 104 may capture sensor data associated with an environment 114 surrounding the vehicle 102. For instance, the lidar sensor(s) 108 may generate lidar data associated with the environment 114, the image sensor(s) 110 may generate image data associated with the environment 114, the radar sensor(s) 112 may generate radar data associated with the environment 114, and so on. In various examples, the sensor(s) 104 may include any number of additional (or alternative) sensors, such as ultrasonic transducers, sonar sensors, location sensors (e.g., global positioning component (GPS), compass, etc.), inertial sensors (e.g., inertial measurement units, accelerometers, magnetometers, gyroscopes, etc.), wheel encoders, environmental sensors (e.g., temperature sensors, humidity sensors, light sensors, pressure sensors, smoke sensors, etc.), depth sensors, time of flight (ToF) sensors, etc. In some examples, one or more of the sensor(s) 104 may be housed within one or more sensor pods coupled to the vehicle 102. In some instances, a single sensor pod may include one or more of the lidar sensor(s) 108, image sensor(s) 110, radar sensor(s) 112, depth sensors, time of flight sensors, accelerometers, and/or the like. The types (or modalities) of sensor data generated by the sensor(s) 104 may include, in addition to the lidar data, image data, and/or radar data, additional data such as ultrasonic transducer data, sonar data, location data (e.g., global positioning component (GPS), compass, etc.), pose data, inertial data (e.g., inertial measurement units data, accelerometer data, magnetometer data, gyroscope data, etc.), wheel encoder data, environmental data (e.g., temperature sensor data, humidity sensor data, light sensor data, pressure sensor data, smoke sensor data, etc.), depth sensor data, ToF sensor data, etc.

The environment 114 in this example may represent a current driving environment of the vehicle 102 capturing the various sensor data. In various examples, the environment 114 may be a real environment or a simulated environment for the vehicle 102. The environment 114 may include a number of objects detectable by the sensor(s) 104, such as any number of additional vehicles 116 and pedestrians 118, along with various other dynamic objects (e.g., bicycles, animals, etc.) and/or static objects (e.g., traffic cones 120, traffic signs, trees, curbs, sidewalks, road debris, etc.) that may be present in the environment 114. The sensor data captured by sensor(s) 104 may include data associated with the various detected objects. For instance, the lidar data captured by lidar sensors 108 and/or the radar data captured by radar sensors 112 may include point clouds associated with the various objects detected in the environment, and the image data captured by the image sensors 110 may include images of the various objects detected in the environment.

In some examples, one or more of the sensor data modalities captured by the sensor(s) 104 may be input into machine-learning pipelines configured and trained to generate object detections (e.g., 3D bounding boxes) based on the sensor data. As shown in this example, the lidar data captured by lidar sensors 108 may be input into an ML lidar pipeline 122 configured to generate object detections representing the set of objects perceived in the environment 114. The ML lidar pipeline 122 may receive as input one or more lidar point clouds, and may output a set of object detections representing the set of perceived objects. Additionally, the image data captured by image sensors 110 may be input into a second ML image pipeline 124 configured to generate object detections representing the set of perceived objects, based on one or more image frames captured by the image sensors 110. Additionally, the radar data captured by radar sensors 112 may be input into a third ML radar pipeline 126 configured to generate object detections representing the set of perceived objects, based on one or more radar point clouds output by the radar sensors 112. Examples of techniques for determining 3D bounding regions associated with objects detected in an environment can be found, for example, in U.S. patent application Ser. No. 15/970,838, filed May 3, 2018, and titled "Associating Lidar Data and Image Data," and in U.S. patent application Ser. No. 16/386, 249, filed Apr. 16, 2019, and titled "Multi-Modal Sensor Data Association Architecture," both of which are incorporated by reference herein, in their entirety, for all purposes.

As noted above, pipelines for processing sensor data and generating object detections (e.g., bounding shapes and associated attributes) based on the sensor data are usually developed independently for particular sensor modalities. In this example, the ML lidar pipeline 122, the ML image pipeline 124, and/or the ML radar pipeline 126 may be developed and operated independently for their respective sensor modalities. Each of the ML lidar pipeline 122, the ML image pipeline 124, and/or the ML radar pipeline 126 may include one or more machine-learned model(s) incorporating any combination of machine-learning components (e.g., multilayer perceptrons, feedforward neural networks, attention components, etc.). In various examples, the ML lidar pipeline 122, ML image pipeline 124, and/or ML radar pipeline 126 may be configured to receive raw sensor data and/or pre-processed sensor data (e.g., processed to include positional embedding, padding, etc.). Additionally, in some examples, the sensor data output by the lidar sensors 108, image sensors 110, and/or radar sensors 112 may be time synchronized such that all of the different sensor data represents substantially the same instance or period of time in the environment 114. In some examples, some or all of the sensor data may be input into a convolutional neural network prior to being input into the ML lidar pipeline 122, ML image pipeline 124, and/or the ML radar pipeline 126. In alternative examples, any or all of the ML pipelines may be replaced with non-ML components configured to analyze sensor data from a sensor modality and output a corresponding set of object detections.

As shown in this example, each of the ML lidar pipeline 122, the ML image pipeline 124, and/or the ML radar pipeline 126 may be configured to output a set of object detections (e.g., 3D bounding boxes and associated attribute data) based on the sensor data from its respective sensor modality. For instance, the ML lidar pipeline 122 may output a first set of object detections 128 representing the objects detected based on one or more lidar point clouds captured by the lidar sensors 108, the ML image pipeline 124 may output a second set of object detections 130 representing the objects detected based on one or more images captured by the image sensors 110, and the ML radar pipeline 126 may output a third set of object detections 132 representing the objects detected based on one or more radar point clouds captured by the radar sensors 112. As shown in this example, each of the sets of object detections 128-132 for the separate modalities may include bounding shapes (or other geometric data) and/or associated attributes for the set of objects detected/perceived by the sensor modality. In some cases, the different sets of object detections may include corresponding (or associated) object detections that represent the same physical object in the environment. However, due to the different sensor characteristics (e.g., range, resolution, field of view, sensor sensitivity, etc.), the different sets of object detections 128-132 need not include the same number of object detections, and not every object detection in each set may correspond to a object detection from a different set received from a different sensor modality. Additionally, as described in more detail below, even when two or more object detections in different sets represent the same physical object in the environment, the location, size, shape, orientation and/or other attributes of the associated bounding shapes might not be identical.

The ML transformer model 106 may be configured to receive one or more sets of object detections (e.g., object detections 128, object detections 130, and object detections 132) from various sensor modalities, and to determine the subsets of associated object detections that correspond to the same physical object in the environment. Additionally, as described below in more detail, the ML transformer model 106 may output a set of combined (or associated) object detections 134 (which may include bounding shapes and/or associated attributes), including a combined object detection for each subset of associated object detections from the input sets that represent the same object. Each combined object detection may include an updated/refined set of attributes (e.g., location, size dimensions, yaw, classification, intent, etc.) based on the attributes of the associated object detections from the different sensor modalities. The ML transformer model 106 may be trained to determine an optimal set of attributes for each combined object detection, so that the combined object detection represents the corresponding object in the environment 114 more accurately than any of the individual object detections from the different sensor modalities.

In some examples, the individual object detections (e.g., object detections 128-132) from the different sensor modalities that represent the same object might not include attributes such as classification, yaw, and/or intent for the object. Additionally or alternatively, an individual object detection representing an object from a first sensor modality may include one or more such attributes, but these attributes may be inconsistent with other object detections from different modalities representing the same object. Accordingly, in some examples, the ML transformer model 106 may be configured to determine attributes such as classifications, yaw, and/or intent of objects detected in the environment 114. Such determinations may be based on the attributes of the individual object detections representing the object from the different sensor modalities, and/or based on other trained ML model(s) within the ML transformer model 106. For instance, the ML transformer model 106 may be configured to determine whether an object is a vehicle, a pedestrian, a cyclist, an animal, a building, vegetation, a traffic sign or traffic control object, or the like.

In various examples, each of the combined (or associated) object detections output from the ML transformer model 106 may include an object detection, object location, object size, object shape, object classification, object yaw, etc. In some instances, the combined object detections 134 output by the ML transformer model 106 may be sent to a planner component 136 associated with the vehicle 102. The planner component 136 may determine one or more actions to perform to control the vehicle 102 based on the combined object detections 134 (and/or additional inputs). For instance, the planner component 136 may determine a trajectory 138 for the vehicle 102 to follow in the environment 114 and/or driving maneuvers to perform based on the combined object detections 134.

Figure 2:
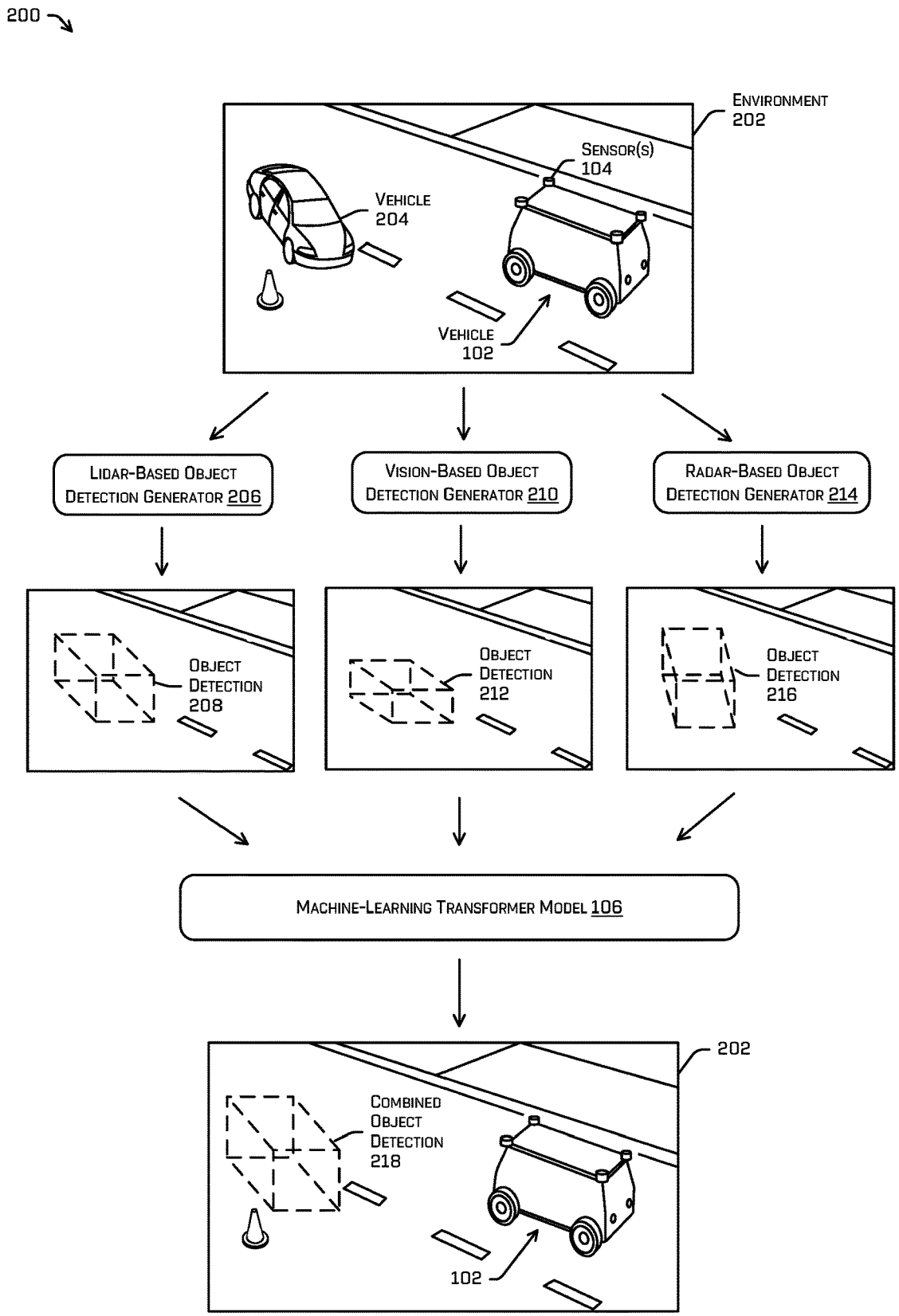
FIG. 2 illustrates an example technique of using a machine-learned transformer model to determine a combined object detection based on associated object detections from different sensor modalities, in accordance with one or more examples of the disclosure.

FIG. 2 shows a diagram 200 illustrating an example technique of using an ML transformer model 106 to generate a combined object detection for a single object, based on the associated object detections representing the object from different sensor modalities. As shown in this example, the vehicle 102 is operating in an environment 202, which may be the same as the environment 114 depicted in FIG. 1. In this example, the sensors 104 of the vehicle may capture multi-modal sensor data representing another vehicle 204 in the environment 202, including at least lidar data, image data, and radar data.

As shown in this example, different components associated with the different sensor modalities may be used to generate object detections representing the vehicle 204. For instance, a lidar-based object detection generator 206 (which may include one or more machine-learned lidar pipelines 122) may receive lidar data from the sensors 104, and may output a first object detection 208 representing the vehicle 204. A vision-based object detection generator 210 (which may include one or more machine-learned image pipelines 124) may receive image data from the sensors 104, and may output a second object detection 212 representing the vehicle 204. A radar-based object detection generator 214 (which may include one or more machine-learned radar pipelines 126) may receive radar data from the sensors 104, and may output a third object detection 216 representing the vehicle 204. As shown in this example, although object detection 208, object detection 212, and object detection 216 each represent the same vehicle 204 in the environment, the location, size, shape, and/or other attributes of these individual object detections may be different, based the characteristics and limitations of their respective sensor modalities.

As noted above, the ML transformer model 106 may receive input sets of object detections from the different sensor modalities, and may output a set of combined object detections representing the objects in the environment 202. In this example, the ML transformer model 106 may receive the input object detections 208, 212, and 216, and may output a combined object detection 218 representing the same object (e.g., vehicle 204). Although this example depicts object detections representing a single object, the ML transformer model 106 may receive any number of object detections representing any number of objects detected in the environment by one or more sensor modalities. The ML transformer model 106 may be trained to initially determine associated subsets of the input object detections that represent the same physical object in the environment. Then, for each subset of associated object detections, the ML transformer model 106 may output a combined object detection/bounding shape having an optimal set of attributes that accurately represents the corresponding object in the environment. As noted above, the ML transformer model 106 may be trained to determine the optimal location, size, shape, classification, yaw, and/or other attributes for the object, based on the attributes from the corresponding object detections of the different sensor modalities, and/or based on different capabilities, limitations, and/or error variations of the different modalities.

Figure 3:
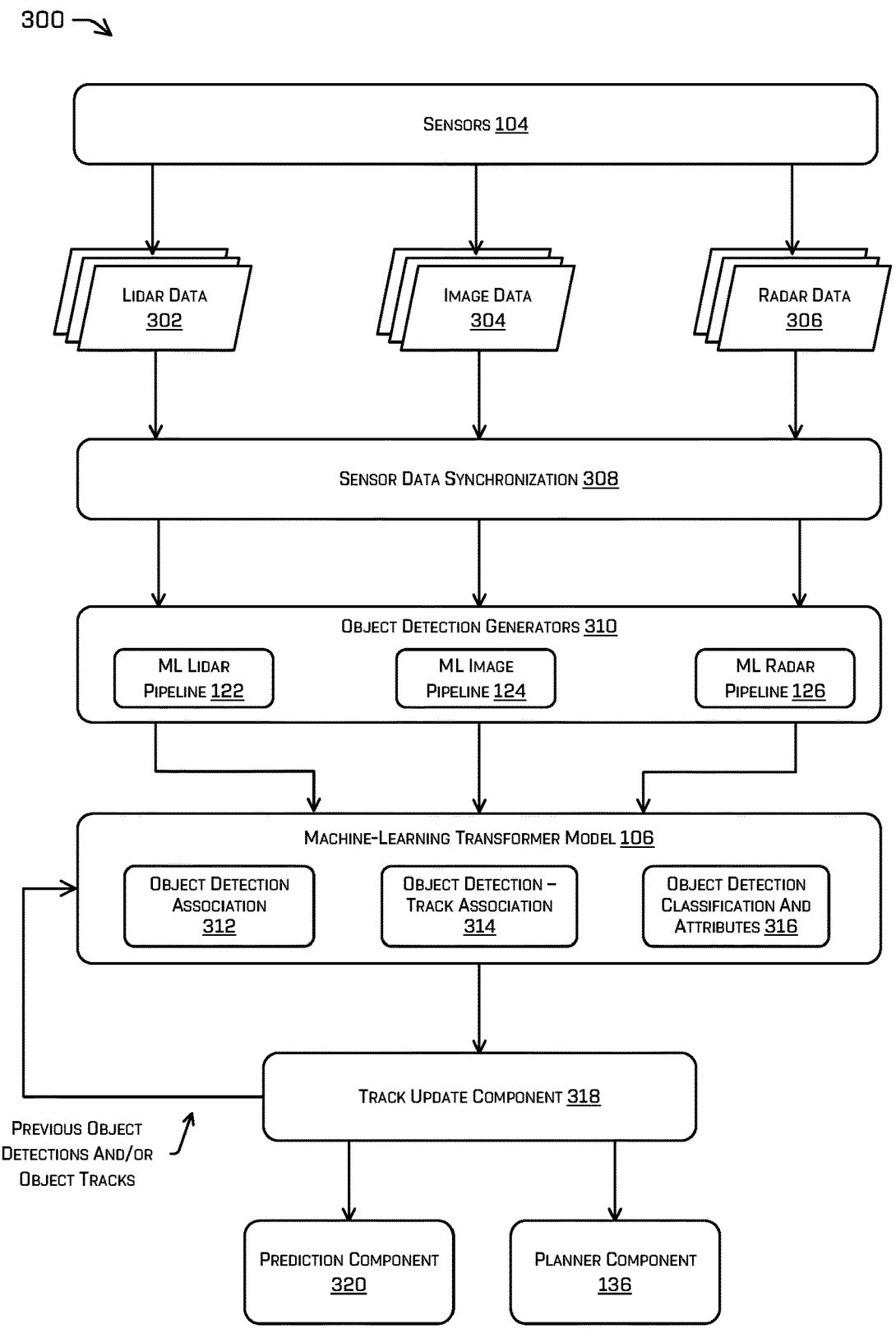
FIG. 3 illustrates an example system associated with a machine-learned transformer model used to determine object detection associations, in accordance with one or more examples of the disclosure.

FIG. 3 illustrates an example system 300 including a machine-learned transformer model 106 implemented within a perception component configured to perform object detection and tracking based on multi-modal sensor data. As shown in this example, sensors 104 may provide lidar data 302, image data 304, radar data 306, and/or additional types/modalities of sensor data to a synchronization component 308. The synchronization component 308 may synchronize the sensor data from the various sensor modalities, such that each data set represents a similar or same instance or period of time within the environment.

After synchronization, the synchronized lidar data, image data, and radar data may be input into one or more object detection generator(s) 310, configured to generate sets of object detections based on the sensor data (e.g., raw and/or processed sensor data) from the various sensor modalities. As noted above, the object detection generator(s) 310 may be implemented and operated individually (e.g., separate for each sensor modality) as separate ML pipelines 122-126, and/or may include a combined ML-based object detection generator. The object detection generator(s) 310 may output separate sets of time synchronized object detections, for the different sensor modalities, to the ML transformer model 106. As noted above, in some cases, two or more of the different ML pipelines 122-126 can output different object detections that correspond to the same real-world object in the physical environment. Additionally, due to potential errors or inaccuracies in the modality-specific ML pipelines 122-126 (e.g., over or under segmentation), a single of the ML pipelines 122-126 can output multiple object detections based on a single perceived object, and/or a single object detection based on multiple perceived real-world objects.

As shown in this example, the ML transformer model 106 may include a number of different subcomponents and/or a number of different ML models configured to determine associations for the object detections received from the various sensor modalities. In this example, the ML transformer model 106 includes an object detection association component 312, an object detection-track association component 314, and an object detection classification and attributes component 316. The object detection association component 312 may include one or more ML models (e.g., an ML transformation model with self-attention) configured to receive input sets of object detections, and to determine associated subsets of the object detections. The object detection-track association component 314 may include one or more additional ML models (and/or may use the same ML models) configured to receive input sets of object detections and object track data for the objects previously detected and tracked by the perception component, and to determine associations between the current object detections and the previously determined object tracks. Additionally, the object detection classification and attributes component 316 may include one or more additional ML models (and/or may use the same ML models) configured to determine the object classification and/or various other attributes of the object (e.g., yaw, velocity, acceleration, intent, etc.), for the object detections that have been combined/associated with other object detections and/or previous object tracks.

In various examples, the ML transformer model 106 may be implemented using different combinations of models and/or components, to perform different techniques for determining associations between the object detections received from the sensor modalities. For instance, in some cases, the ML transformer model 106 may determine first that a subset of the object detections is associated (e.g., using a first ML transformation model), and then may determine that the subset of the object detections is associated with a previous object track (e.g., using the same model or a separate ML model or other components). In other cases, the ML transformer model 106 may use a single ML model (or set of associated models) to simultaneously determine associations between one or more object detections and one or more previous object tracks.

Similarly, in some cases, the ML transformer model 106 may determine first that a subset of the object detections is associated (e.g., using a first ML transformation model), and then may determine the classification and/or attributes of the subset of associated object detections (e.g., using a separate ML model or other components). In other cases, the ML transformer model 106 may use a single ML model (or set of associated models) to simultaneously determine associations between subsets of object detections and the optimal predicted classification/attributes for the associated subsets of object detections. In various other examples, the ML models included and/or the functionality performed by the object detection association component 312, the object detection-track association component 314, and the object detection classification and attributes component 316, can be performed simultaneously using the same ML model(s), in parallel using different combinations of ML models, and/or sequentially in any order using various combinations of different ML models.

As noted above, the ML transformer model 106 may receive previous sets of object detections and/or object track data for objects that have been previously detected and/or tracked by the perception component at previous times in the environment. For example, the ML transformer model 106 may retrieve a set of previous object detections, which may be similar or identical in type/format to any of the object detections described herein, but may be based on previous sensor data captured of the environment at a previous time steps. For instance, previous object detections may include object detections based on previous sensor data (e.g., previously captured image frames, lidar point clouds, radar point clouds, etc.) for any number of previous times/time steps (e.g., input/output processing cycles, etc.) of the perception component.

In addition to or instead of using previous object detections, in some examples, the ML transformer model 106 may retrieve and use track data for any number of the objects previously detected and tracked by the perception component. Track data may include, for example, data defining a driving path and/or trajectory for a dynamic object in the environment. For instance, the track data for an object may be defined as a combination of a curvature (or yaw) and a velocity (or acceleration) for a sequence of one or more time points or locations in the environment. Additionally or alternatively, track data may be defined by sequences of vehicle states and/or poses, and/or continuous driving paths with velocities, accelerations, etc. The ML transformer model 106 may use the track data for any previously detected objects to project (or otherwise predict) the locations and states of the previously detected objects at the time corresponding to the sets of object detections received from the object detection generator(s) 310.

In various examples, the ML transformer model 106 may use previous object detections and/or previous object track data in various ways. In some cases, the ML transformer model 106 may use the previous object detections and/or track data as inputs to a transformer model to determine the associations between the subsets of current object detections (e.g., the object detections received from the object detection generator(s) 310 of the sensor modalities). Additionally or alternatively, the transformer model 106 may use one or more transformers to determine associations between the current object detections and the previous object detections and/or track data (e.g., for determining track updates for the previous object tracks).

The track update component 318 may receive the set of object detections from the ML transformer model 106, and may determine new/updated tracks for the detected objects. In some examples, the data received by the track update component 318 may include the determined associations between the object detections and the previous object detections and/or object tracks. To determine new/updated tracks, the track update component 318 may analyze the object detections for the current scene relative to the previous object detections and/or object track data. In some cases, the track update component 318 may use attributes of the object detections determined by the ML transformer model 106 (e.g., classification, yaw, velocity, etc.) to estimate the geometry and motion of the dynamic objects in the environment. The track update component 318 may use integrated box and contour estimation algorithms to determine optimally accurate and consistent object track data based on a combination of the previous and current object data. In some instances, the track update component 318 may determine track updates independently for different portions of an object (e.g., a front and a rear portion of a vehicle).

The output of the track update component 318 may include the perceived object data and track data for any number of the objects detected at a current scene in the environment. The object detections and associated track data may be used by any number of downstream processing components used to control the vehicle 102, including a prediction component 320 including functionality to generate predicted object trajectories and future states in the environment, and/or a planner component 136 configured to determine a path for the vehicle 102 to follow to traverse the environment.

Figure 4:
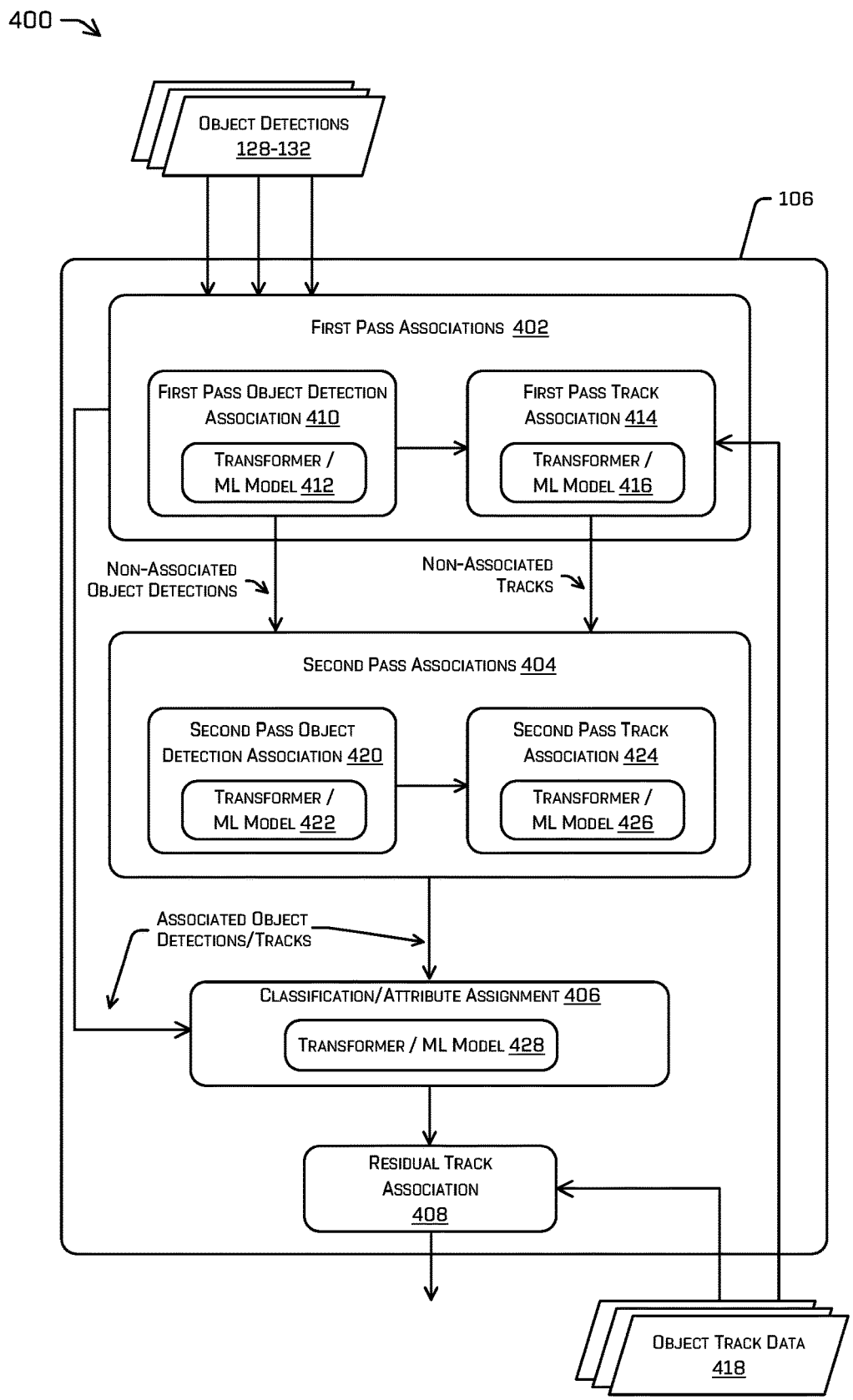
FIG. 4 illustrates an example system including a machine-learned transformer model configured to determine object detection associations and attributes based on input object detections from sensor modalities and feedback associated with a previous scene in the environment, in accordance with one or more examples of the disclosure.

FIG. 4 shows an example system 400 of a design for an ML transformer model 106 configured to determine associations between object detections, as well as associations between object detections and previous object tracks, and to determine the attributes for the combined/associated object detections. As shown in this example, the ML transformer model 106 may receive an input set of current object detections from one or more sensor modalities (e.g., detection sets 128-132), as well as object track data 418 (which may include previous object detections and/or previous object tracks).

In this example, the ML transformer model 106 may determine object detection associations in multiple passes. Although two separate association passes are shown in this example, in other examples any number of different association passes may be used within the ML transformer model 106. In this example, after the multi-pass association stage, the ML transformer model 106 may execute another processing stage to determine the classifications/attributes for the associated/combined object detections, followed by a residual track association.

As noted above, determining that two or more object detections are associated with one another may include determining that the object detections represent the same physical object in the environment. For instance, a first object detection 208, a second object detection 212, and a third object detection 216 from different sensor modalities may be associated because each of the object detections corresponds to the same object (e.g., vehicle 204) in the environment.

The first pass associations component 402 may perform an initial first pass to determine associations between subsets of the object detections received from the sensor modalities (e.g., detection sets 128-132), as well as associations between the object detections and the object track data 418 representing the previous object detections and/or tracks of objects previous detected and tracked by the perception component. As shown in this example, the first pass associations component 402 may include a first pass object detection association component 410 that is configured to use a first transformer model 412 (e.g., a transformer model with self-attention) to determine one or more associated subsets of object detections. In some instances, the first transformer model 412 may receive a variable input set of object detections (e.g., any number of object detections, in any order, and from any number of modalities), and may be configured and trained to output associated sets of the object detections based solely on the current object detections themselves (e.g., without using previous object detections or track data from the object track data 418). To determine object detection associations, the first transformer model 412 may be trained using ground truth data to determine (e.g., predict) the associated subsets, based on the geometric data of the object detections (e.g., the location, size, shape, and orientation of the bounding shapes), as well as the various attributes of the object detections (e.g., classification, yaw, velocity, etc.). The training data and process for the first transformer model 412 also may include the source modality for the various object detections, so that the model may be trained to take into account the different capabilities, limitations, and/or error variations associated with the different sensor modalities.

The results determined by the first pass object detection association component 410 may include a number of subsets of object detections that were successfully associated by the first transformer model 412, and/or additional object detections that were not successfully associated by the first transformer model 412 (which may be referred to as residual object detections). The object detections that were successfully associated by the first transformer model 412 may be provided to the first pass track association component 414, which may include a second transformer model 416 configured to associate the object detections with the tracks of previously detected and tracked objects from the object track data 418. The second transformer model 416 also may include a transformer model with self-attention, and may be same model or different from the first transformer model 412 in different examples. To determine associations between object detections and tracks, the second transformer model 416 may be trained using ground truth data to determine (e.g., predict) a track associated with an object detection (or vice versa), based on any combination of the object detection geometric data (e.g., bounding shapes) and attributes (e.g., classification, yaw, velocity, etc.), as well as the previous tracks and/or projected or predicted tracks of objects within the object track data 418. Additionally or alternatively, the second transformer model 416 may be configured to use object track data 418 to determine associations between object detections that could not be successfully associated solely from the object detections themselves.

As shown in this example, any residual object detections that were not associated with other object detections by the first pass object detection association component 410, and any residual object tracks that were not associated with object detections by the first pass track association component 414, may be provided to the second pass associations component 404. In some examples, the design and structure of the second pass associations component 404 may be similar or identical to that of the first pass associations component 402. For instance, the second pass associations component 404 may include a second pass object detection association component 420, including a third transformer model 422 (which may be the same as or different from any of the previous models described above) configured to determine associations between sets of residual object detections for which associations could not be determined in the first pass. Similarly, the second pass associations component 404 may include a second pass track association component 424, including a fourth transformer model 426 (which may be the same as or different from any of the previous models described above), configured to determine associations between any of the residual object detections and residual tracks for which associations could not be determined in the first pass.

The type and structure of the ML models and/or the techniques used by the third transformer model 422 and the fourth transformer model 426 can be similar or identical to those of the first transformer model 412 and/or second transformer model 416, or may be different. In some examples, any or all of these models may be implemented as ML transformers with decoder/encoder architectures (although other ML models may be used other examples). Any or all of these models may include self-attention and/or cross-attention components to allow the inputs (e.g., object detections and/or tracks) to interact with other inputs. Additionally, although these models are represented as separate ML models in this example, in other examples the same ML model may be used to perform the various associations in the first pass associations component 404 and/or the second pass associations component 404. In such cases, the weights and/or thresholds of the model(s) may be modified when used to determine object detection associations versus track associations, and/or for first pass versus second pass determinations, etc.

Although this example depicts techniques for determining associations (e.g., between subsets object detections and/or between object detections and tracks) in two separate passes, in other examples, the ML transformation model 106 may use any number of passes to determine the associations (e.g., three passes, four passes, etc.). As illustrated in these examples, a multi-pass technique for determining associations may improve the accuracy and performance of the overall outputs. For instance, because the inputs to the second pass associations component 404 may exclude the object detections and/or tracks that were associated during the first pass, a smaller number of residual object detections and track inputs may be provided to the third transformer model 422 and the fourth transformer model 426. The smaller set of residual inputs received by the second pass associations component 404 may be more relevant and less noisy, thereby allowing the models within the second pass associations component 404 to be tuned more effectively (e.g., by adjusting the weights, thresholds, encoding/decoding layers, etc.) to identify the more difficult and less obvious associations among the residual object detections that were not identified during the first pass. Because the second pass associations component 404 receives the residual object detection inputs from the first pass associations component 402, it may have more context for determining/generating missing object detections, and potentially eliminating the need for non-maximum suppression between the first pass and second pass. As noted above, when ML transformer models are used by the second pass associations component 404 (e.g., the third transformer model 422 and the fourth transformer model 426), these models may include weights that are specialized and fine-tuned to determine associations that are more difficult to detect. In such cases, targeted training strategies (e.g., batch balancing and/or data augmentation) and threshold-tuning also may be used by the second pass associations component 404 to handle the more difficult object detection associations.

The associations of object detections and/or track associations determined by the first pass associations component 402 and/or the second pass associations component 404, data identifying the associations may be provided to the classification/attribute assignment component 406. The classification/attribute assignment component 406 may determine, for each subset of associated object detections, a combined object detection representing the object in the environment. To determine accurate object classifications and/or attributes, the classification/attribute assignment component 406 may include one or more machine-learning components (e.g., ML model 428) configured to determine (e.g., predict) the object location, size, shape, classification, yaw, intent, etc. The determinations of classifications and attributes for the combined/associated object detections (e.g., combined object association 218) may be based on the attributes of the associated object detections from the various sensor modalities (e.g., object detections 208, 212, and 216), and/or may be based on object track data 418 including previous object detections and/or previous tracks associated with the combined object detection. In various examples, the classification/attribute assignment component 496 may be trained to determine (e.g., predict) an optimal classification and/or attributes for a detected object, based on the attributes from the corresponding object detections, and taking into account ground truth data relating to the different capabilities, limitations, and/or error variations associated with different sensors, different sensor modalities, different driving environments/conditions, etc.

In this example, the first pass associations component 402 and the second pass associations component 404 may be configured to update the object tracks (e.g., in the object track data 418) for any tracks determined to be associated with one or more object detections in the input set of object detections. However, for any residual tracks from the object track data 418 that were not associated with object detections in the first pass or second pass, and/or for any object detections that were not associated with existing tracks, the residual track association component 408 may be configured to update the object track data 418 accordingly. In some examples, unassociated object detections may be used to determine and/or generate one or more new tracks in the object track data (e.g., by clustering one or more object detections at one or more sequential time points that are unassociated with any existing object tracks). Additionally or alternatively, the residual track association component 408 may be configured to end and/or remove an existing track from the object track data 418, for example, in response to not identifying any object detection(s) associated with the existing track within an input set of object detections, or after a threshold time and/or threshold number of sequential input sets of object detections. Examples of additional techniques and features for updating track data, including generating new tracks and removing existing tracks, based on object detections from sensor observations, can be found, for example, in U.S. patent application Ser. No. 18/103,936, filed Jan. 31, 2023, and titled "Object Detection Using Similarity Determinations For Sensor Observations," which is incorporated by reference herein, in its entirety, for all purposes.

As noted above, any number of different machine learning architectures may be used to implement the various systems and techniques described herein, and these techniques are not limited to any specific architecture. For instance, FIGS. 5A and 5B depict two different example architectures for machine-learned transformer models with self-attention that may be used to implement one or more examples of the techniques described herein.

Figure 5A:
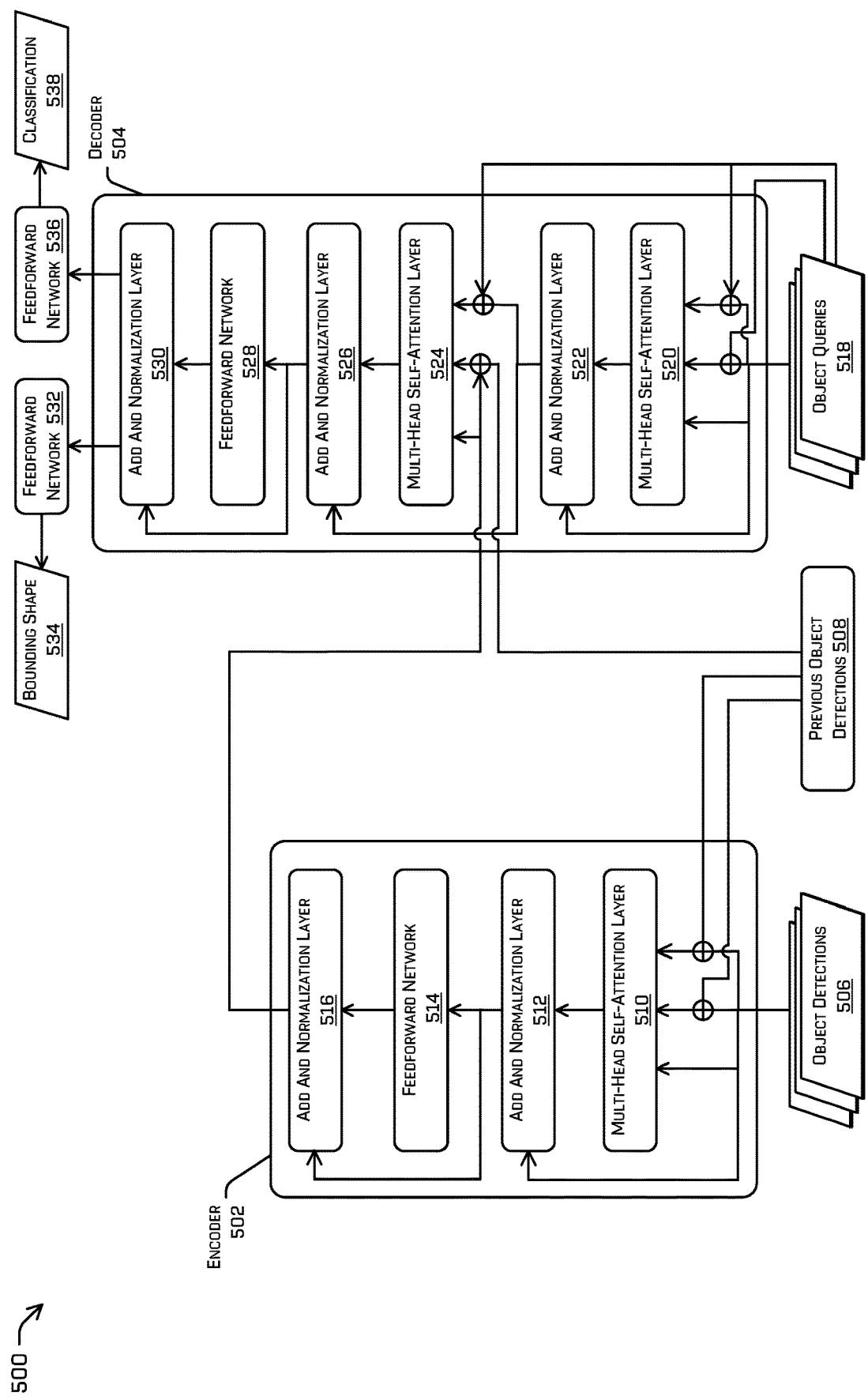
FIGS. 5A and 5B depicts two different example architectures for a machine-learned transformer model that may be used for implementing various techniques described herein.

FIG. 5A depicts a first example transformer 500 configured to receive input sets of object detections and output a set of combined/associated object detections. The transformer 500 includes an encoder/decoder architecture with self-attention. In this example, an encoder 502 receives input as object detections 506 and previous object detections 508, and includes a multi-head self-attention layer 510, a subsequent add and normalization layer 512, a feedforward network 514, and another add and normalization layer 516. The decoder 504 in this example receives outputs from the encoder 502 as well as object queries 518 (which may include, for example, object detection queries and/or track queries). The decoder 504 includes a first multi-head self-attention layer 520, a subsequent add and normalization layer 522, a second multi-head self-attention layer 524, another add and normalization layer 526, a feedforward network 528, and another add and normalization layer 530. The output of the decoder 504 may be provided to one or more downstream processing components, including an additional feedforward network 532 configured to determine and output a combined object detection 534, and a separate feedforward network 536 configured to determine and output classification data 538 associated with the object detection 534.

Figure 5B:
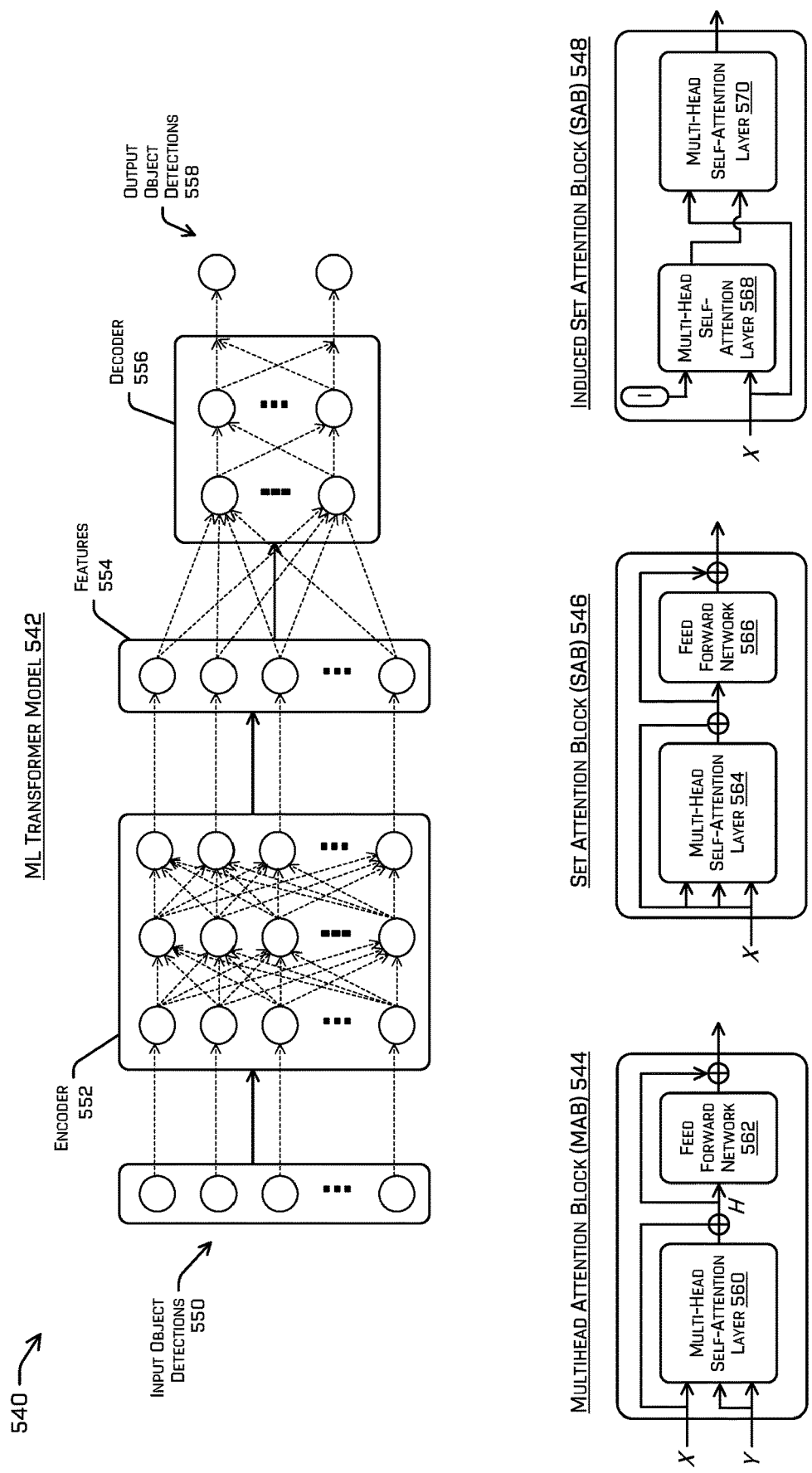

FIG. 5B depicts a second example transformer 540 configured to receive input sets of object detections and output a set of combined/associated object detections. As with the example transformer 500, transformer 540 also includes an encoder/decoder architecture with self-attention. In this example, an ML transformer model 542 is configured to receive a vector of input object detections 550 (e.g., embeddings), and to use an encoder/decoder architecture (e.g., an encoder 552, features 554, and decoder 556) to transform the set of input object detections 550 into an output vehicle of combined object detections 558. Also shown in FIG. 5B are three attention-based set operations: a multi-head attention block (MAB) 544 including a multi-head self-attention layer 560 and a feedforward network 562; a set attention block (SAB) 546 including a multi-head self-attention layer 564 and a feedforward network 566; and an induced set attention block (ISAB) 548 including a first multi-head self-attention layer 568 and a second multi-head self-attention layer 570.

Figure 6:
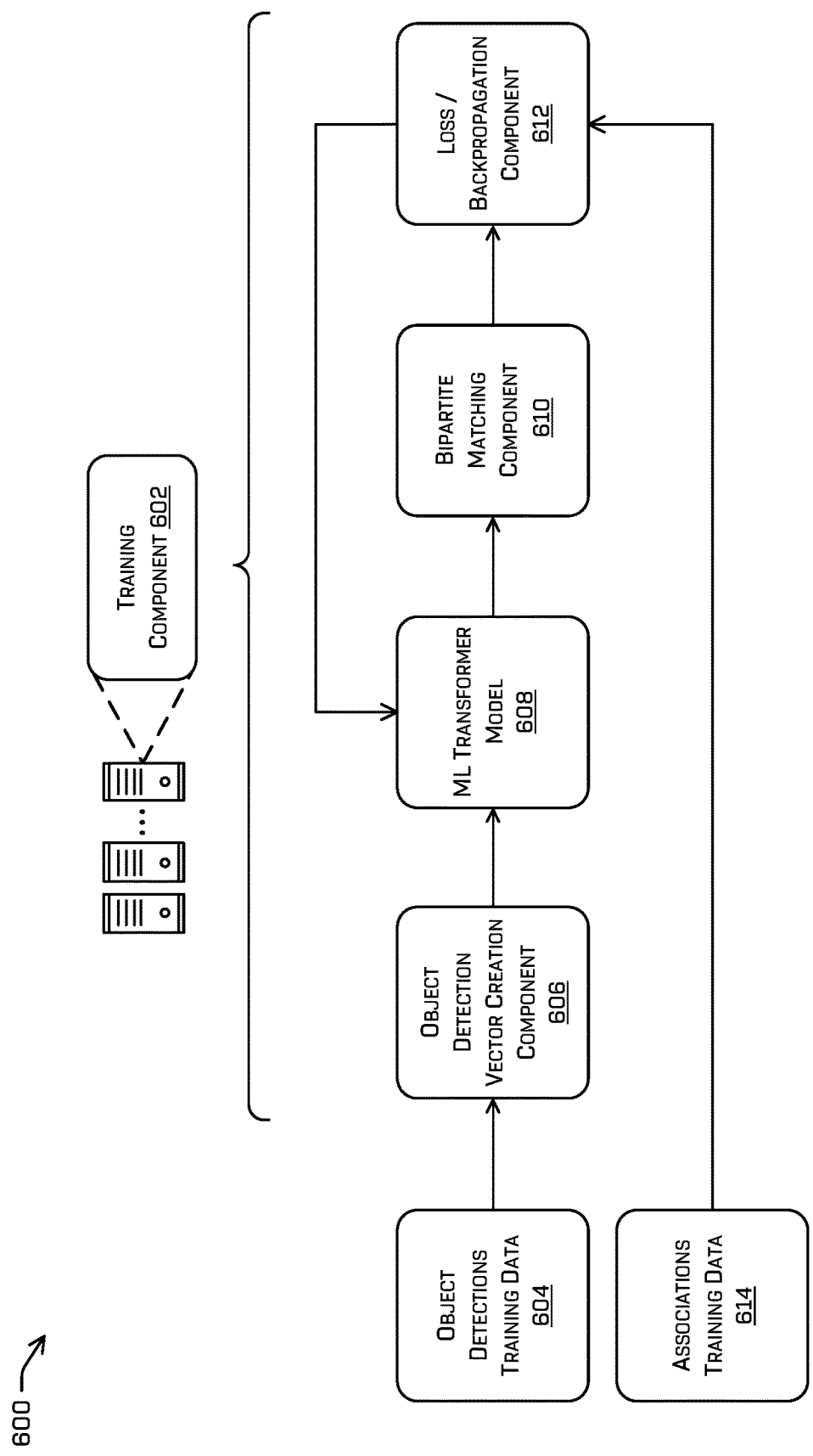
FIG. 6 depicts an example technique for training machine-learned transformer model for determining object detection associations, may be used for implementing various techniques described herein, in accordance with one or more examples of the disclosure.

FIG. 6 depicts an example training system 600 including a training component 602 configured to train the various ML transformer models 106 described herein. As shown in this example, one or more training data generators and/or training data repositories may be used generate object detections training data 604. In some examples, the object detections training data 604 may include raw sensor data and/or processed sensor data including object detections from various sensor modalities. The object detections training data 604 may be based on real and/or simulated driving environments. The object detections training component 602 may include an observation vector creation component 606 configured to generate observation vectors based on input driving scenes, the ML transformer model 608 to be trained by the training component 602, and a bipartite matching component 610 configured to evaluate the outputs of the ML transformer model 608 relative to the ground truth training data. The training component 602 also may include one or more loss functions and/or backpropagation components 612, configured to adjust the weights, thresholds and/or other features of the ML transformer model 608 during the training process. As described above, in various examples the training component 602 may generate and/or train different ML transformer models 608 to be used within different object detection and tracking systems, and/or for different association passes of the same system. In such cases, different ML transformer models 608 may be trained to be specialized and fine-tuned to determine different types of object detection associations. The training component may use any combination of training strategies (e.g., batch balancing and/or data augmentation) and/or threshold-tuning for training different ML transformer models 608.

As noted above, the training component 602 may include one or more training data generators, and/or may access training data repositories to generate or receive the object detection training data 604. In some examples, the training component 602 may be configured to perform auto-labeling during the ground truth data generation. The auto-labeling may be configured to generate associations between the object detections (and associations between object detections and tracks) within the ground truth data received by the upstream ML pipelines for the sensor modalities. In some instances, the training component 602 may use one or more matching algorithms to determine ground truth associations for the ground truth object associations generated on-the-fly.

In some examples, the training component 602 may support end-to-end training of the ML transformer model 608. That is, rather than training each modality, model, process, module, etc. individually, all of the models, processes, modules, etc. of the ML transformer models 608 may be trained together by inputting a set of known or annotated ground truth data and then altering one or more parameters of the models, processes, modules, etc. based on an output from the ML transformer model 608 to align with the ground truth data. In some examples, training the ML transformer model 608 end-to-end may include building an annotated training dataset of sets of object detections, based on previous driving scenes, driving environments, etc. Examples of techniques for determining bounding shape training data sets can be found, for example, in U.S. patent application Ser. No. 17/538,909, filed Nov. 30, 2021, and titled "Generating and Training Object Detection Models for Autonomous Vehicles," which is incorporated by reference herein, in its entirety, for all purposes.

After receiving and/or generating the annotated training dataset, the data/dataset may be input into the ML transformer model 608 for training, as shown in this example. In some cases, the trained ML transformer model 608 may be used to mine additional data and extract new ground truth data samples, such as samples of detected object detections. In some examples, the ML transformer model 608, and/or individual sensor modality ML pipelines 122-126, may be evaluated based on performance metrics. If the performance of the ML transformer model 608 and/or machine-learning pipelines 122-126 is acceptable, the ML transformer model 608 may be released into production for online use in vehicles 102. However, if the performance of the machine-learning pipeline is not acceptable, the ML transformer model 608 may be further trained for additional improvement. For instance, if an output of the model is incorrect, the loss function and/or backpropagation component 612 may adjust one or more parameters of the ML transformer model 608, including parameters of individual models, processes, modules, etc. to improve the model.

As shown in this example, the loss functions and/or evaluation of the ML transformer model 608 by the backpropagation component 612 may rely on a second source of ground truth data including associations training data 614. As noted above, the object detections training data 604 may include ground truth object detections (e.g., sensor observations, bounding shapes, attributes, etc.), which may human-labeled or machine-labeled, and may be stable over time. In contrast, the associations training data 614 may include ground truth associations between sets of object detections, and/or between object detections and tracks, to allow the backpropagation component 612 to evaluate the performance of the ML transformer model 608. Examples of additional techniques and features for model training to determine object detection and/or track associations can be found, for example, in U.S. patent application Ser. No. 18/103,936, filed Jan. 31, 2023, and titled "Object Detection Using Similarity Determinations For Sensor Observations," which is incorporated by reference herein, in its entirety, for all purposes.

Figure 7:
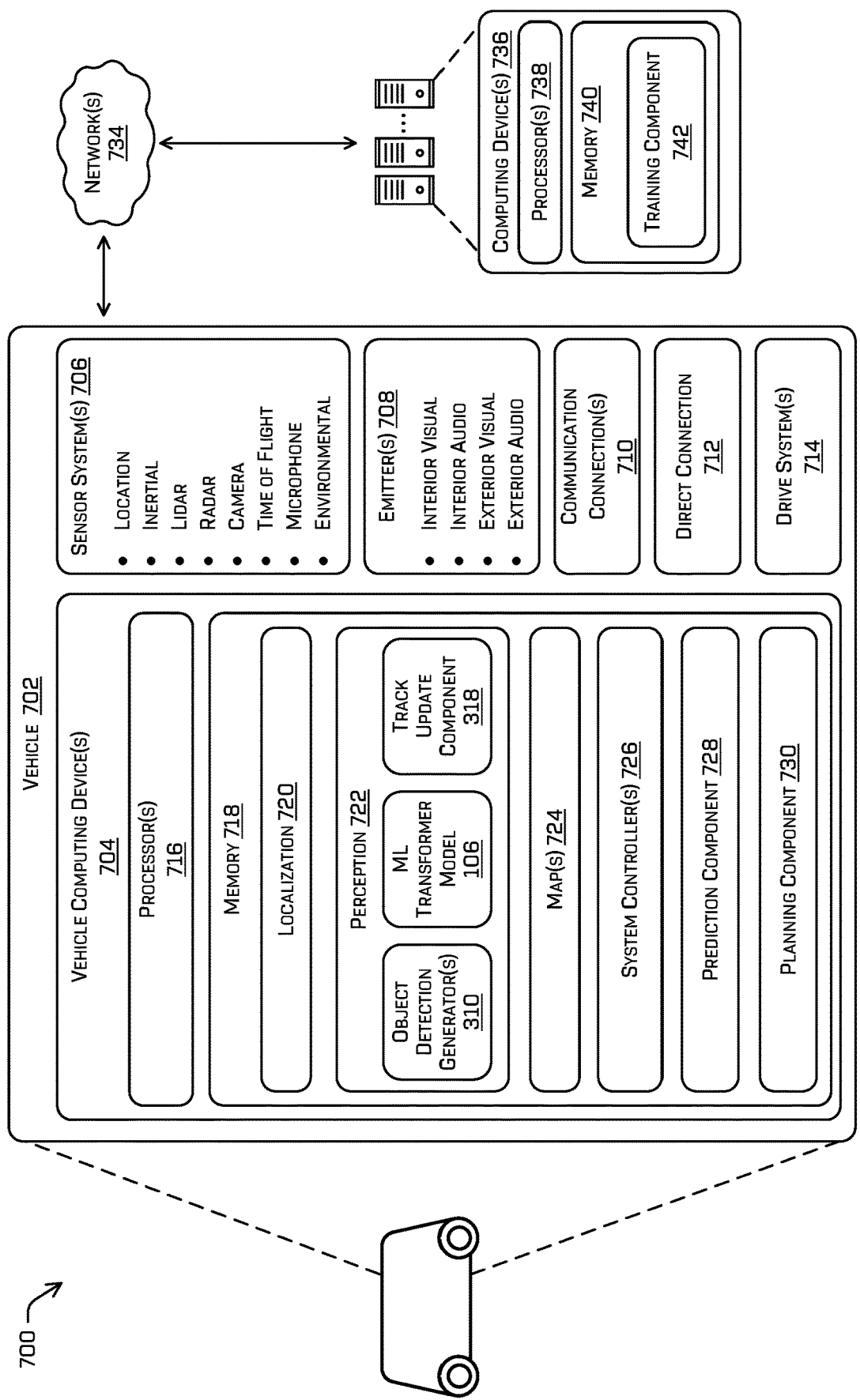
FIG. 7 depicts a block diagram of an example system for implementing various techniques described herein.

FIG. 7 depicts a block diagram of an example system 700 for implementing various techniques described herein. In some instances, the example system 700 may include a vehicle 702, which may represent the vehicle 102 discussed above in FIG. 1-6. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 702 which can be configured to perform various techniques described herein, including utilizing trained ML models (e.g., ML transformer model 106) for object detection and tracking, which may be deployed within the vehicle 702 while operating in a driving environment. In some examples, the vehicle 702 also may be configured to provide log data to one or more separate computing devices 736 configured to train ML transformer models as described herein. Additionally or alternatively, the vehicle 702 may receive and execute one or more ML transformer models 106 from separate computing devices 736, which may be integrated within a perception component configured to detect and track objects in the environment, based on multi-modal sensor data, using the various techniques described herein.

The vehicle 702 may include vehicle computing device(s) 704, sensor(s) 706, emitter(s) 708, network interface(s) 710, at least one direct connection 712 (e.g., for physically coupling with the vehicle to exchange data and/or to provide power), and one or more drive system(s) 714. In this example, the vehicle 702 may correspond to vehicle 102 discussed above. The system 700 may additionally or alternatively comprise computing device(s) 704.

In some instances, the sensor(s) 706 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 736.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive systems(s) 714. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 736. In some examples, computing device(s) 736 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 734. For example, the network interface(s) 710 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) 734, to the computing device(s) 736 at a particular frequency, after a lapse of a predetermined period of time, in near real-time, etc.

In some instances, the vehicle 702 may include one or more drive systems(s) 714 (or drive components). In some instances, the vehicle 702 may have a single drive system 714. In some instances, the drive system(s) 714 may include one or more sensors to detect conditions of the drive system(s) 714 and/or the surroundings of the vehicle 702. By way of example and not limitation, the sensor(s) of the drive systems(s) 714 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 714. In some cases, the sensor(s) on the drive systems(s) 714 may overlap or supplement corresponding systems of the vehicle 702 (e.g., sensor(s) 706).

The drive systems(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 714 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 714. Furthermore, the drive systems(s) 714 may also include one or more communication connection(s) that enable communication by the respective drive component with one or more other local or remote computing device(s).

The vehicle computing device(s) 704 may include processor(s) 716 and memory 718 communicatively coupled with the one or more processors 716. Computing device(s) 736 may also include processor(s) 738, and/or memory 740. As described above, the memory 740 of the computing device(s) 736 may store and execute a training component 742, which may be similar or identical to the training component 602 described above in reference to FIG. 6, and may be configured to perform any combination of training functionality for ML transform models 106 described herein.

The processor(s) 716 and/or 738 may be any suitable processor capable of executing instructions to process data and perform operations as described herein. By way of example and not limitation, the processor(s) 716 and/or 738 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 718 and/or 740 may be examples of non-transitory computer-readable media. The memory 718 and/or 740 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and/or memory 740 may store a localization component 720, perception component 722, maps 724, system controller(s) 726, prediction component 728, and/or planning component 730. The perception component 722 may include one or more ML transformer models 106 and/or related components (e.g., object detection generators 310 for the various sensor modalities, a track update component 318, etc.) configured to determine object detection associations and combined object detections from various sensor modalities, as described in the examples herein.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include map(s) of an environment and can continuously determine a location, velocity, and/or orientation of the autonomous vehicle within the map(s). In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the planning component 730 and/or to the prediction component 728, a location and/or orientation of the vehicle 702 relative to the environment and/or sensor data associated therewith.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 724 may include at least one map (e.g., images and/or a mesh) generated in accordance with the techniques discussed herein. In some examples, the vehicle 702 can be controlled based at least in part on the maps 724. That is, the maps 724 can be used in connection with the localization component 720, the perception component 722, and/or the planning component 730 to determine a location of the vehicle 702, identify objects in an environment, and/or generate routes and/or trajectories to navigate within an environment.

In some instances, the perception component 722 may comprise a primary perception system and/or a prediction system implemented in hardware and/or software. The perception component 722 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 722 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 728 may include functionality to generate predicted information associated with objects in an environment. As an example, the prediction component 728 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 728 can generate one or more predicted positions, predicted velocities, predicted trajectories, etc., for such target objects based on attributes of the target object and/or other objects proximate the target object.

The planning component 730 may receive a location and/or orientation of the vehicle 702 from the localization component 720, perception data from the perception component 722, and/or predicted trajectories from the prediction component 728, and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 726 and/or drive systems(s) 714 may parse/cause to be carried out, second instructions for the emitter(s) 708 may be formatted according to a second format associated therewith). In at least one example, the planning component 730 may comprise a nominal trajectory generation subcomponent that generates a set of candidate trajectories, and selects a trajectory for implementation by the drive systems(s) 714 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 718 and/or 740 may additionally or alternatively store a mapping system (e.g., generating a map based at least in part on sensor data), a planning system, a ride management system, etc. Although localization component 720, perception component 722, the prediction component 728, the planning component 730, and/or system controller(s) 726 are illustrated as being stored in memory 718, any of these components may include processor-executable instructions, machine-learned model(s) (e.g., a neural network), and/or hardware and all or part of any of these components may be stored on memory 740 or configured as part of computing device(s) 736.

As described herein, the localization component 720, the perception component 722, the prediction component 728, the planning component 730, and/or other components of the system 700 may comprise one or more ML models. For example, the localization component 720, the perception component 722, the prediction component 728, and/or the planning component 730 may each comprise different ML model pipelines. The prediction component 728 may use a different ML model or a combination of different ML models in different circumstances. For example, the prediction component 728 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 718 may additionally or alternatively store one or more system controller(s) 726, which may be configured to control steering, propulsion, braking, safety, emitters, communication, and other systems of the vehicle 702. These system controller(s) 726 may communicate with and/or control corresponding systems of the drive systems(s) 714 and/or other components of the vehicle 702.

In an additional or alternate example, vehicle 702 and/or computing device(s) 736 may communicate (e.g., transmit and/or receive messages over network(s) 734) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 702. For example, the passenger device may additionally or alternatively comprise a display and/or one or more input/output devices, such as a touchscreen, microphone, speaker, and/or the like. In some examples, the vehicle 702 may transmit messages and/or receive messages from the passenger device.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Figure 8:
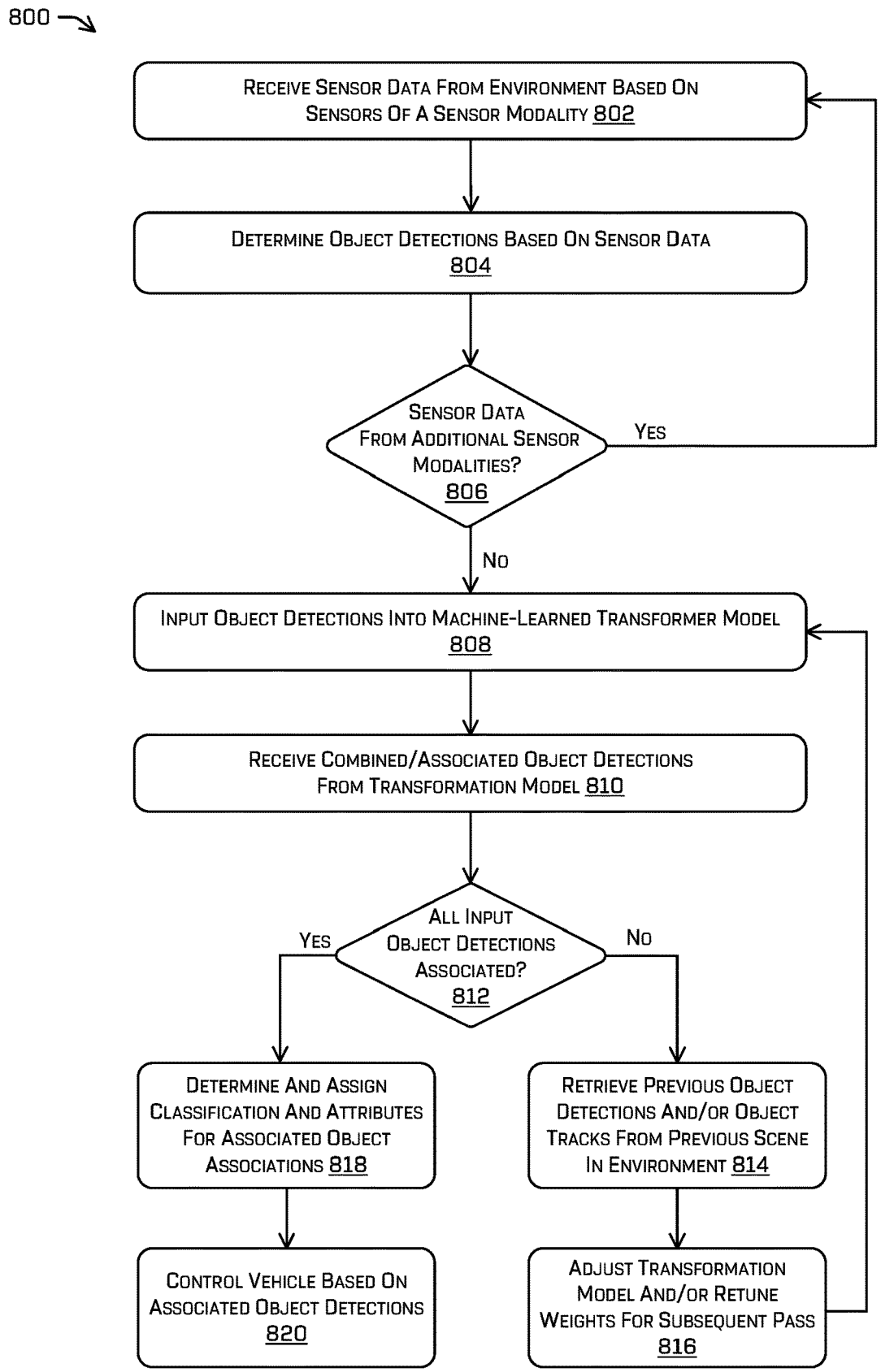
FIG. 8 is a flow diagram illustrating an example process for using an ML transformer model to determine object detection associations, in accordance with one or more examples of the disclosure.

FIG. 8 is a flow diagram illustrating an example process 800 for determining object detection associations and the attributes for combined object detections, based on sensor data from various sensor modalities. As described herein, the operations of process 800 may be performed by a perception component 722 including an ML transformer model 106 (and/or the additional related components or subcomponents) described above in reference to FIGS. 1-7. In various examples, process 800 may be performed by a perception component 722 within a vehicle 102 configured to perform object detection and/or tracking functionality for controlling the vehicle 102 within a driving environment.

At operation 802, the perception component 722 may receive sensor data captured by one or more sensors in an environment. As shown in this example, the sensor data received in operation 802 may include sensor data captured by sensors of a single sensor modality. For instance, the received sensor data may include lidar data (e.g., a lidar point cloud) captured by lidar sensor(s) 108 of the vehicle 102, image data (e.g., image frames) captured by image sensor(s) 110 of the vehicle, radar data (e.g., a radar point cloud) captured by radar sensor(s) 112 of the vehicle 102, and/or the like.

At operation 804, the perception component 722 may generate a set of corresponding object detections based on the sensor data received in operation 802. As discussed above, the perception component 722 may include a number of object detection generation components, including modality-specific machine-learning pipelines developed and operated separately for each sensor data type/modality. For example, in operation 804, the perception component 722 may input the received sensor data into a ML lidar pipeline 122, ML image pipeline 124, or ML radar pipeline 126, depending on the sensor modality of the received data.

At operation 806, the perception component 722 may determine whether additional sensor data is available (e.g., received or to be received) from any other sensor modalities. For instance, if an initial set of object detections is based on lidar data captured of the environment, then additional image data, radar data, depth data, etc., may be available for the same environment at a time synchronized (e.g., within a time threshold) of the lidar data. When additional time-synchronized data is available from one or more sensor modalities (806: Yes), process 800 may return to operations 802 and 804 to receive the additional sensor data of the same environment from a different sensor modality (in operation 802), and to generate an additional set of object detections based on the additional sensor data (in operation 804).

When there are no additional sensor modalities from which time-synchronized sensor data can be received (806: No), then process 800 may proceed to operation 808, where the perception component 722 may input the sets of object detections received from the various sensor modalities into an ML transformer model 106. As discussed above, based on the design of the ML transformer model 106 (e.g., an encoder/decoder architecture with self-attention), the ML transformer model 106 may receive an input set of object detections having a variable size (e.g., any number of input shapes may be accepted), without having a defined order, and may produce a variable-sized output of combined object detections. In some examples, the input to the ML transformer model 106 may be a vector of object detections, where each object detection is represented as a location (e.g., a perceived center point for the object) and one or more size dimensions.

At operation 810, the ML transformer model 106 may generate and/or receive the output of the ML transformer model 106, including a set of combined (or associated) object detections. Each of the combined object detections may represent a physical object in the environment, and may include the set of attributes (e.g., location, size, shape, classification, yaw, intent, etc.) determined based on the individual object detections from the various sensor modalities.

At operation 812, the ML transformer model 106 may determine whether there are any residual object detections, from the input set of object detections, that could not be associated by the ML transformer model 106 with other object detections from different modalities. When a number of residual object detections exist following a pass of the ML transformer model 106 (812: No), then at operation 814 and/or operation 816 the perception component 722 may perform additional operations in preparation of a second (or subsequent) pass of the ML transformer model 106 to determine additional object detection associations. For example, at operation 814, the perception component 722 may retrieve previous object detections and/or track data associated with a previous time in the same environment (e.g., the previous outputs of the ML transformer model 106 for the most recent previous set of time-synchronized sensor data). Additionally or alternatively to operation 814, at operation 816 the perception component 722 may adjust the weights, thresholds, and/or other features of the ML transformer model 106. After performing one or both of operation 814 and/or operation 816, process 800 may return to operation 808 to perform a subsequent pass of the ML transformer model 106 in order to determine associations for the additional residual object detections that were not associated in the previous pass.

After all (or a threshold number) of the object detections in the input set of object detections to the ML transformer model 106 have been associated (812: Yes), then in operation 818 the ML transformer model 106 may determine assign the object classification and/or additional attributes for each of the successfully combined (or associated) object detections. In some examples, operation 818 also may be performed even when not all of the input object detections have been associated, for instance, based on a determination by the perception component 722 that no additional object detections can be associated, either with current object detections or with previous object detections and/or object track data, with a sufficiently high confidence.

At operation 820, the perception component 722 may output the combined object detections and corresponding attributes to one or more downstream components configured to control the operation of the vehicle 102 within the environment. For instance, the detected objects and associated track data included within sequential sets of combined object detections may be used by the prediction component to generate predicted object trajectories and future states in the environment, and/or the planner component to determine a path for the vehicle 102 to follow to traverse the environment.

Example Clauses

A. A system comprising: one or more processors; and one or more non-transitory computer-readable media storing computer-executable instructions that, when executed, cause the one or more processors to perform operations comprising: receiving first sensor data generated by a first modality of sensor of a vehicle, the first modality being lidar; determining, based on the first sensor data, a first object detection representing an object in an environment; receiving second sensor data generated by a second modality of sensor of the vehicle, the second modality being radar or vision; determining, based on the second sensor data, a second object detection representing the object; inputting the first object detection and the second object detection into a machine-learned transformer model, wherein the machine-learned transformer model is configured to: receive a variable number of input object detections, and determine associations between the input object detections; determining, by the machine-learned transformer model and based at least in part on the first object detection and the second object detection, a third object detection representing the object; and controlling operation of the vehicle, based at least in part on the third object detection representing the object.

B. The system of paragraph A, wherein the machine-learned transformer model is further configured to: receive input representing an object track associated with a previous scene of the environment; and determine the associations between the input object detections, based at least in part on the object track.

C. The system of paragraph A, wherein the machine-learned transformer model includes a self-attention component configured to: determine a first embedding associated with the first object detection; and determine a second embedding associated with the second object detection.

D. The system of paragraph A, wherein the machine-learned transformer model is further configured to: determining, in a first association stage, that the first object detection and the second object detection are associated with the object; and determining, in a second classification stage after the first association stage, at least one of a classification, a yaw, or an intent associated with the object.

E. The system of paragraph D, wherein performing the first association stage in the machine-learned transformer model includes: performing a first object detection association pass, based at least in part on a first set of object detections; determining, based on least in part on an output of the first object detection association pass, a residual subset of the first set of object detections not associated during the first object detection association pass; and performing a second object detection association pass after the first object detection association pass, based at least in part on the residual subset of the first set of object detections.

F. A method comprising: receiving first sensor data generated by a first modality of sensor; determining, based on the first sensor data, a first object detection representing an object; receiving second sensor data generated by a second modality of sensor; determining, based on the second sensor data, a second object detection representing the object; inputting the first object detection and the second object detection into a machine-learned transformer model; determining, by the machine-learned transformer model and based at least in part on the first object detection and the second object detection, a third object detection representing the object; and controlling operation of a vehicle, based at least in part on the third object detection representing the object.

G. The method of paragraph F, wherein the machine-learned transformer model is configured to: receive a non-fixed number of input object detections, and output a non-fixed number of output object detections.

H. The method of paragraph F, wherein inputting the first object detection and the second object detection comprises: providing, as input to the machine-learned transformer model, first input data representing the first object detection and second input data representing the second object detection, wherein the first input data comprises first geometric data associated with the first object detection and first classification data associated with the first object detection, and wherein the second input data comprises second geometric data associated with the second object detection and second classification data associated with the second object detection.

I. The method of paragraph F, wherein the first object detection and the second object detection are associated with a scene of an environment at a first time, and wherein the machine-learned transformer model is configured to receive additional input representing an object track associated with a previous scene of the environment at a previous time before the first time.

J. The method of paragraph F, wherein the machine-learned transformer model includes a self-attention component configured to: determine a first embedding associated with the first object detection; and determine a second embedding associated with the second object detection.

K. The method of paragraph F, wherein the machine-learned transformer model is configured to: determining, in a first association stage, that the first object detection and the second object detection are associated with the object; and determining, in a second classification stage after the first association stage, at least one of a classification, a yaw, or an intent associated with the object.

L. The method of paragraph K, wherein performing the first association stage in the machine-learned transformer model includes: performing a first object detection association pass, based at least in part on a first set of object detections; determining, based on least in part on an output of the first object detection association pass, a residual subset of the first set of object detections not associated during the first object detection association pass; and performing a second object detection association pass after the first object detection association pass, based at least in part on the residual subset of object detections.

M. The method of paragraph F, further comprising: receiving third sensor data generated by a third modality of sensor; determining, based on the third sensor data, a third object detection representing the object; and inputting the third object detection, with the first object detection and the second object detection into the machine-learned transformer model, wherein the first modality of sensor includes lidar, the second modality of sensor includes vision, and the third modality of sensor includes radar.

N. One or more non transitory computer readable media storing instructions executable by a processor, wherein the instructions, when executed, cause the processor to perform operations comprising: receiving first sensor data generated by a first modality of sensor; determining, based on the first sensor data, a first object detection representing an object; receiving second sensor data generated by a second modality of sensor; determining, based on the second sensor data, a second object detection representing the object; inputting the first object detection and the second object detection into a machine-learned transformer model; determining, by the machine-learned transformer model and based at least in part on the first object detection and the second object detection, a third object detection representing the object; and controlling operation of a vehicle, based at least in part on the third object detection representing the object.

O. The one or more non transitory computer readable media of paragraph N, wherein the machine-learned transformer model is configured to: receive a non-fixed number of input object detections, and output a non-fixed number of output object detections.

P. The one or more non transitory computer readable media of paragraph N, wherein inputting the first object detection and the second object detection comprises: providing, as input to the machine-learned transformer model, first input data representing the first object detection and second input data representing the second object detection, wherein the first input data comprises first geometric data associated with the first object detection and first classification data associated with the first object detection, and wherein the second input data comprises second geometric data associated with the second object detection and second classification data associated with the second object detection.

Q. The one or more non transitory computer readable media of paragraph N, wherein the first object detection and the second object detection are associated with a scene of an environment at a first time, and wherein the machine-learned transformer model is configured to receive additional input representing an object track associated with a previous scene of the environment at a previous time before the first time.

R. The one or more non transitory computer readable media of paragraph N, wherein the machine-learned transformer model includes a self-attention component configured to: determine a first embedding associated with the first object detection; and determine a second embedding associated with the second object detection.

S. The one or more non transitory computer readable media of paragraph N, wherein the machine-learned transformer model is configured to: determining, in a first association stage, that the first object detection and the second object detection are associated with the object; and determining, in a second classification stage after the first association stage, at least one of a classification, a yaw, or an intent associated with the object.

T. The one or more non transitory computer readable media of paragraph S, wherein performing the first association stage in the machine-learned transformer model includes: performing a first object detection association pass, based at least in part on a first set of object detections; determining, based on least in part on an output of the first object detection association pass, a residual subset of the first set of object detections not associated during the first object detection association pass; and performing a second object detection association pass after the first object detection association pass, based at least in part on the residual subset of object detections.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving first sensor data generated by a first modality of sensor of a vehicle, the first modality being lidar;
determining, based on the first sensor data, a first bounding shape representing an object in an environment at a first time;
receiving second sensor data generated by a second modality of sensor of the vehicle, the second modality being radar or vision;
determining, based on the second sensor data, a second bounding shape representing the object at the first time;
inputting the first bounding shape and the second bounding shape into a machine-learned transformer model, wherein the machine-learned transformer model is configured to:
receive a variable number of input bounding shapes, and
determine associations between the input bounding shapes;
determining, by the machine-learned transformer model and based at least in part on the first bounding shape and the second bounding shape, a combined bounding shape representing the object at the first time; and
controlling operation of the vehicle, based at least in part on the combined bounding shape representing the object.

2. The system of claim 1, wherein the machine-learned transformer model is further configured to:
receive input representing an object track associated with a previous scene of the environment; and
determine the associations between the input bounding shapes, based at least in part on the object track.

3. The system of claim 1, wherein the machine-learned transformer model includes a self-attention component configured to:
determine a first embedding associated with the first bounding shape; and
determine a second embedding associated with the second bounding shape.

4. The system of claim 1, wherein the machine-learned transformer model is further configured to:
determining, in a first association stage, that the first bounding shape and the second bounding shape are associated with the object; and
determining, in a second classification stage after the first association stage, at least one of a classification, a yaw, or an intent associated with the object.

5. The system of claim 4, wherein performing the first association stage in the machine-learned transformer model includes:

performing a first bounding shape association pass, based at least in part on a first set of bounding shapes;
determining, based on least in part on an output of the first bounding shape association pass, a residual subset of the first set of bounding shapes not associated during the first bounding shape association pass; and
performing a second bounding shape association pass after the first bounding shape association pass, based at least in part on the residual subset of the first set of bounding shapes.

6. A method comprising:
receiving first sensor data of an environment generated by a first modality of sensor;
determining, based on the first sensor data, a first geometric representation representing an object at a first time in the environment;
receiving second sensor data of the environment generated by a second modality of sensor;
determining, based on the second sensor data, a second geometric representation representing the object at the first time, wherein the second geometric representation is different from the first geometric representation;
inputting the first geometric representation and the second geometric representation into a machine-learned transformer model;
determining, by the machine-learned transformer model and based at least in part on the first geometric representation and the second geometric representation, a third geometric representation representing the object at the first time; and
controlling operation of a vehicle, based at least in part on the third geometric representation representing the object.

7. The method of claim 6, wherein the machine-learned transformer model is configured to:
receive a non-fixed number of input geometric representations, and
output a non-fixed number of output geometric representations.

8. The method of claim 6, wherein inputting the first geometric representation and the second geometric representation comprises:
providing, as input to the machine-learned transformer model, first input data representing the first geometric representation and second input data representing the geometric representation,
wherein the first input data comprises first geometric data associated with the first geometric representation and first classification data associated with the first geometric representation, and
wherein the second input data comprises second geometric data associated with the second geometric representation and second classification data associated with the second geometric representation.

9. The method of claim 6, wherein the machine-learned transformer model is configured to:
determining, in a first association stage, that the first geometric representation and the second geometric representation are associated with the object; and
determining, in a second classification stage after the first association stage, at least one of a classification, a yaw, or an intent associated with the object.

10. The method of claim 9, wherein performing the first association stage in the machine-learned transformer model includes:
performing a first geometric representation association pass, based at least in part on a first set of geometric representations;
determining, based on least in part on an output of the first geometric representation association pass, a residual subset of the first set of geometric representations not associated during the first geometric representation association pass; and
performing a second geometric representation association pass after the first geometric representation association pass, based at least in part on the residual subset of geometric representation.

11. The method of claim 6, further comprising:
receiving third sensor data generated by a third modality of sensor;
determining, based on the third sensor data, a fourth geometric representation representing the object; and
inputting the fourth geometric representation, with the first geometric representation and the second geometric representation into the machine-learned transformer model,
wherein the first modality of sensor includes lidar, the second modality of sensor includes vision, and the third modality of sensor includes radar.

12. The method of claim 6, wherein controlling the operation of the vehicle comprises:
rendering the third geometric representation representing the object into a top-down view of the environment; and
providing the top-down view of the environment as input to a neural network trained to output predicted state data associated with the object.

13. The method of claim 6, wherein determining the third geometric representation further comprises inputting, to the machine-learned transformer model:
first data indicating a first sensor modality type associated with the first geometric representation; and
second data indicating a second sensor modality type associated with the second geometric representation.

14. One or more non-transitory computer-readable media storing instructions executable by a processor, wherein the instructions, when executed, cause the processor to perform operations comprising:
receiving first sensor data of an environment generated by a first modality of sensor;
determining, based on the first sensor data, a first geometric representation representing an object at a first time in the environment;
receiving second sensor data of the environment generated by a second modality of sensor;
determining, based on the second sensor data, a second geometric representation representing the object at the first time, wherein the second geometric representation is different from the first geometric representation;
inputting the first geometric representation and the second geometric representation into a machine-learned transformer model;
determining, by the machine-learned transformer model and based at least in part on the first geometric representation and the second geometric representation, a third combined geometric representation representing the object at the first time; and
controlling operation of a vehicle, based at least in part on the combined geometric representation representing the object.

15. The one or more non-transitory computer-readable media of claim 14, wherein the machine-learned transformer model is configured to:
- receive a non-fixed number of input geometric representations, and
- output a non-fixed number of output geometric representations.

16. The one or more non-transitory computer-readable media of claim 14, wherein inputting the first geometric representation and the second geometric representation comprises:
- providing, as input to the machine-learned transformer model, first input data representing the first geometric representation and second input data representing the second geometric representation,
- wherein the first input data comprises first geometric data associated with the first geometric representation and first classification data associated with the first geometric representation, and
- wherein the second input data comprises second geometric data associated with the second geometric representation and second classification data associated with the second geometric representation.

17. The one or more non-transitory computer-readable media of claim 14, wherein the first geometric representation and the second geometric representation are associated with a scene of an environment at the first time, and
- wherein the machine-learned transformer model is configured to receive additional input representing an object track associated with a previous scene of the environment at a previous time before the first time.

18. The one or more non-transitory computer-readable media of claim 14, wherein the machine-learned transformer model includes a self-attention component configured to:
- determine a first embedding associated with the first geometric representation; and
- determine a second embedding associated with the second geometric representation.

19. The one or more non-transitory computer-readable media of claim 14, wherein the machine-learned transformer model is configured to:
- determining, in a first association stage, that the first geometric representation and the second geometric representation are associated with the object; and
- determining, in a second classification stage after the first association stage, at least one of a classification, a yaw, or an intent associated with the object.

20. The one or more non-transitory computer-readable media of claim 19, wherein performing the first association stage in the machine-learned transformer model includes:
- performing a first geometric representation association pass, based at least in part on a first set of geometric representations;
- determining, based on least in part on an output of the first geometric representation association pass, a residual subset of the first set of geometric representations not associated during the first geometric representation association pass; and
- performing a second geometric representation association pass after the first geometric representation association pass, based at least in part on the residual subset of geometric representations.

* * * * *

UNITED STATES PATENT AND TRADEMARK OFFICE
CERTIFICATE OF CORRECTION

PATENT NO. : 12,416,730 B1  
APPLICATION NO. : 18/104082  
DATED : September 16, 2025  
INVENTOR(S) : Francesco Papi et al Page 1 of 1

It is certified that error appears in the above-identified patent and that said Letters Patent is hereby corrected as shown below:

In the Claims

Column 34, Line 63, change "third combined geometric representation representing" to -- combined geometric representation representing --

Signed and Sealed this  
Twenty-eighth Day of October, 2025

John A. Squires  
*Director of the United States Patent and Trademark Office*